US012018451B2

(12) United States Patent
Curry

(10) Patent No.: US 12,018,451 B2
(45) Date of Patent: Jun. 25, 2024

(54) CANTILEVERED RESILIENT STRUT CONNECTOR

(71) Applicant: BRITANNIA ENGINEERING (ISLE OF MAN) LIMITED, Isle of Man (GB)

(72) Inventor: Peter Curry, Surrey (GB)

(73) Assignee: BRITANNIA ENGINEERING (ISLE OF MAN) LIMITED, Isle of Man (GB)

(*) Notice: Subject to any disclaimer, the term of this patent is extended or adjusted under 35 U.S.C. 154(b) by 0 days.

(21) Appl. No.: 17/253,396

(22) PCT Filed: Jun. 21, 2019

(86) PCT No.: PCT/GB2019/051744
§ 371 (c)(1),
(2) Date: Dec. 17, 2020

(87) PCT Pub. No.: WO2020/008166
PCT Pub. Date: Jan. 9, 2020

(65) Prior Publication Data
US 2021/0262187 A1    Aug. 26, 2021

(30) Foreign Application Priority Data

Jul. 4, 2018    (GB) ..................... 1810943

(51) Int. Cl.
*E02D 5/52*    (2006.01)
*E02B 17/00*    (2006.01)
(Continued)

(52) U.S. Cl.
CPC .......... *E02D 5/526* (2013.01); *E02B 17/0004* (2013.01); *E02B 17/0034* (2013.01);
(Continued)

(58) Field of Classification Search
CPC ........ F16B 7/0406; F16B 7/0413; F16B 7/14; F16B 7/1463; E02D 5/52; E02D 5/523;
(Continued)

(56) References Cited

U.S. PATENT DOCUMENTS 2,982,586 A    5/1961   Gliebe
3,857,590 A *  12/1974  Meeker ................... F16L 13/00
                                                138/155
(Continued)

FOREIGN PATENT DOCUMENTS

CA    2126904 A  *  12/1995
DE    4119642 A  *  12/1992
(Continued)

OTHER PUBLICATIONS

Great Britain Patent Application No. GB1810943.9, Combined Search and Examination Report under Sections 17 and 18(3), dated Dec. 24, 2018, 5 pages.
(Continued)

*Primary Examiner* — Sunil Singh
(74) *Attorney, Agent, or Firm* — Leber IP Law; Celia H. Leber

(57) ABSTRACT

The present invention relates to a joint arrangement for joining first and second longitudinally aligned members, said joint arrangement comprising at least one strut arranged to project from at least one of said first and second longitudinally aligned members, said at least one strut comprising a proximal end attached to the member from which it projects and a remote (distal) end arranged to be displaced away from said member, said distal end arranged to abut a complementary stop in/on the other member when said second member penetrates said first member, wherein said at
(Continued)

least one strut is a compression strut which acts to resist withdrawal of the second member via compression in the strut.

21 Claims, 25 Drawing Sheets

(51) Int. Cl.
 *F16B 7/14* (2006.01)
 *F16L 37/084* (2006.01)
 *F16L 37/12* (2006.01)

(52) U.S. Cl.
 CPC .. *E02B 2017/0065* (2013.01); *E02D 2600/20* (2013.01); *F16B 7/14* (2013.01); *F16L 37/084* (2013.01); *F16L 37/12* (2013.01)

(58) Field of Classification Search
 CPC ... E02D 5/526; E21B 17/1021; E21B 17/046; E21B 23/02; F16L 37/084; F16L 37/12; F16L 37/1235; F16L 37/133; F16L 37/138
 USPC ............. 403/329; 52/165; 405/250, 251
 See application file for complete search history.

(56) References Cited

U.S. PATENT DOCUMENTS

| 4,105,348 | A | * | 8/1978 | Anderson | ............ F16B 7/0446 211/182 |
| 4,176,717 | A | | 12/1979 | Hix | |
| 5,119,922 | A | * | 6/1992 | Yamaguchi | ............ F16D 1/104 198/789 |
| 5,516,190 | A | | 5/1996 | Kain et al. | |

FOREIGN PATENT DOCUMENTS

| DE | 4119642 A1 | | 12/1992 |
| EP | 3321521 A1 | | 5/2018 |
| GB | 2179083 A | * | 2/1987 |
| GB | 2332256 A | | 6/1999 |
| GB | 2497193 A | | 6/2013 |
| JP | 2005248665 A | * | 9/2005 |
| WO | WO 96/24003 A1 | * | 8/1996 |

OTHER PUBLICATIONS

International Patent Application No. PCT/GB2019/051744, International Search Report dated Sep. 11, 2019, 3 pages.
International Patent Application No. PCT/GB2019/051744, Written Opinion dated Sep. 11, 2019, 5 pages.

\* cited by examiner

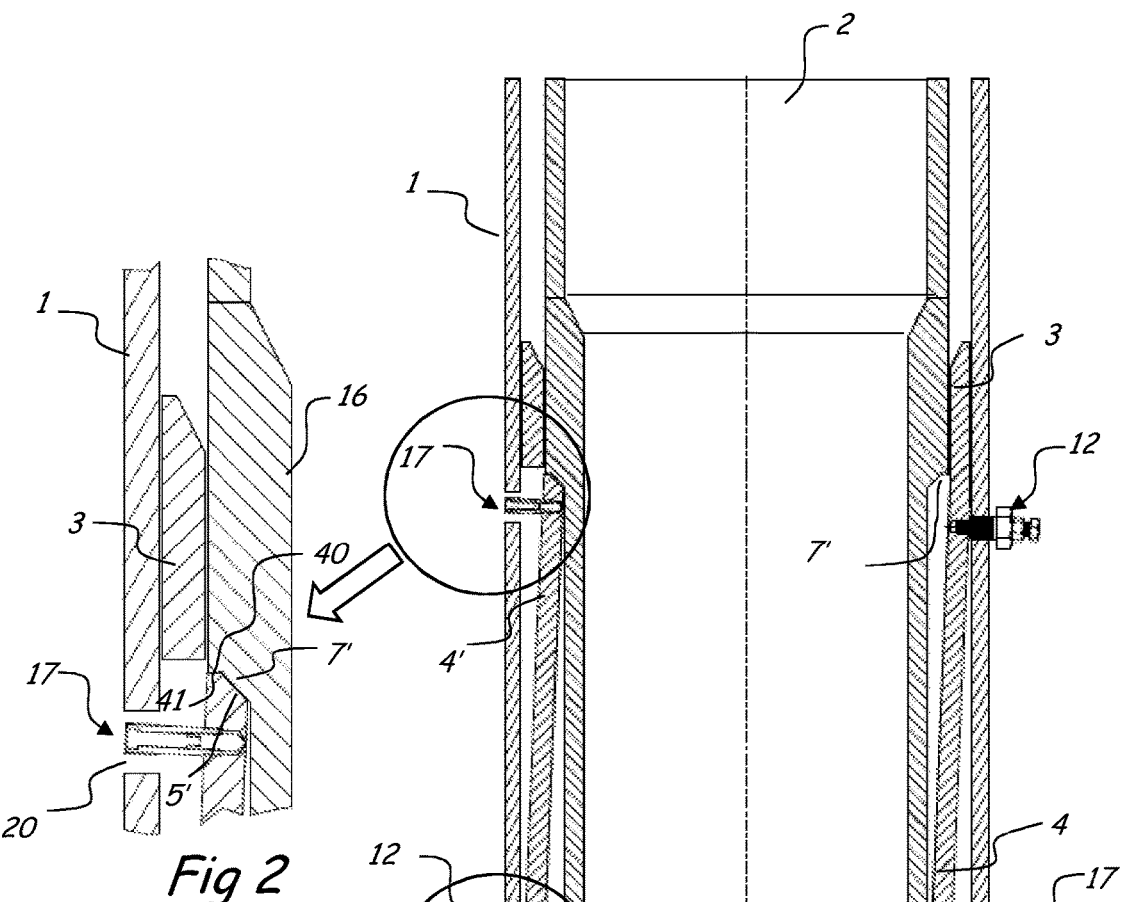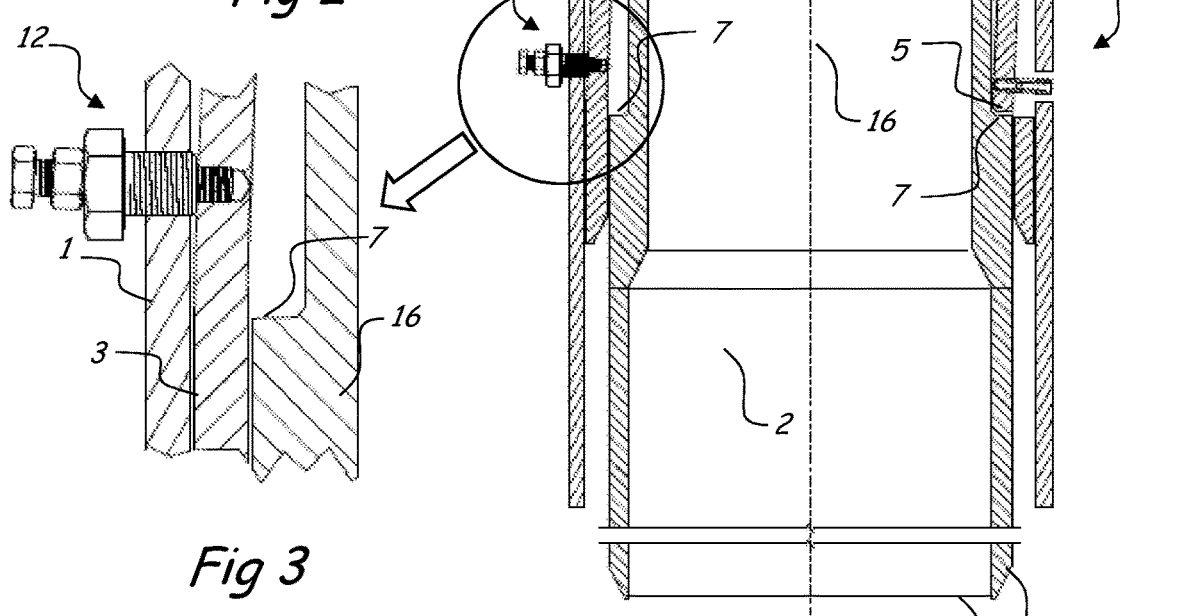

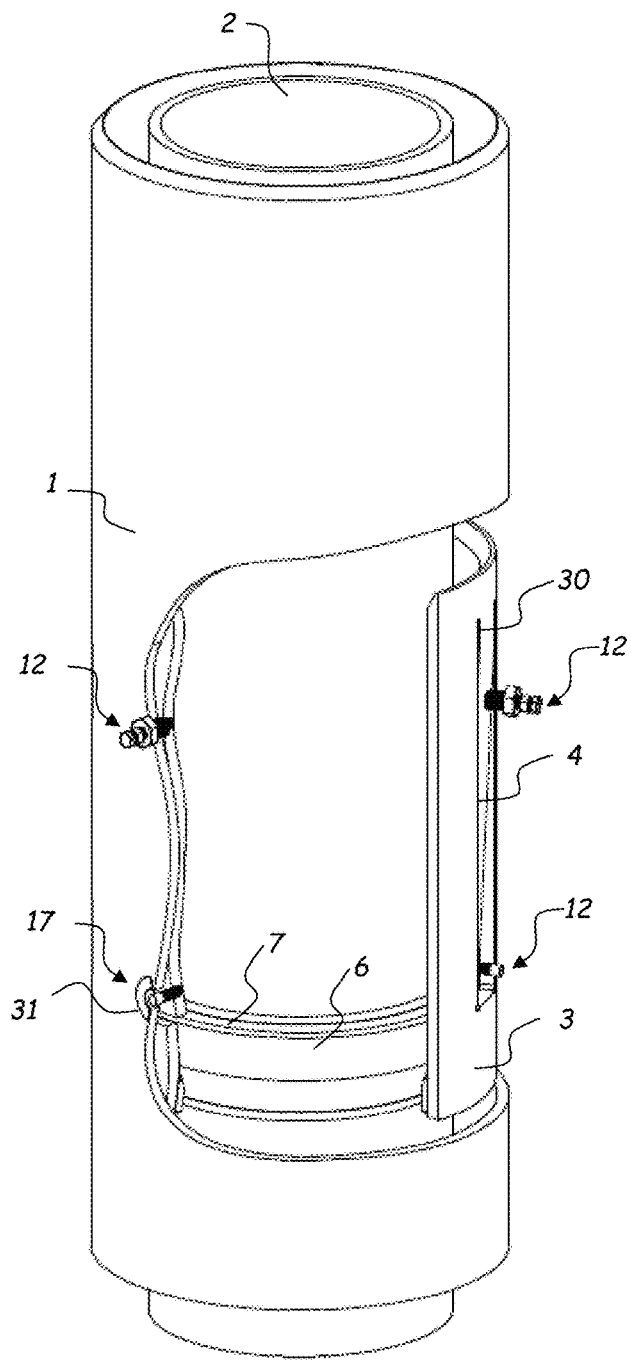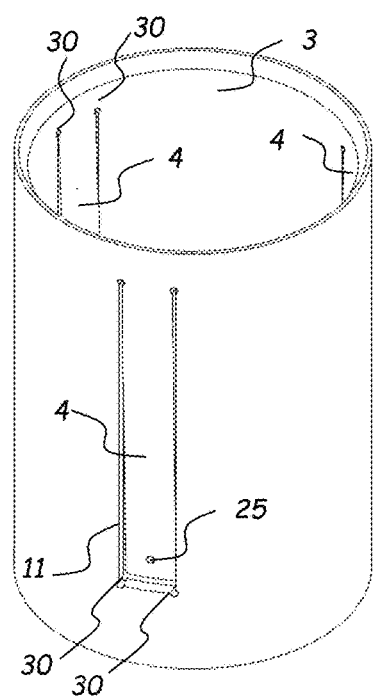
Fig 7
Fig 8

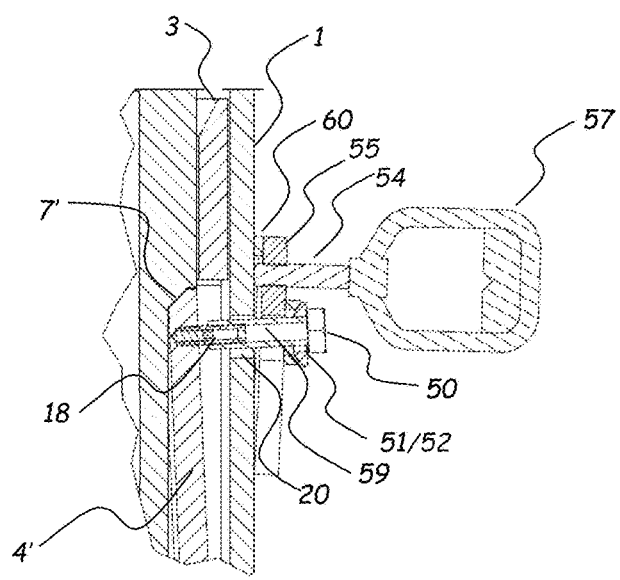
Fig 12
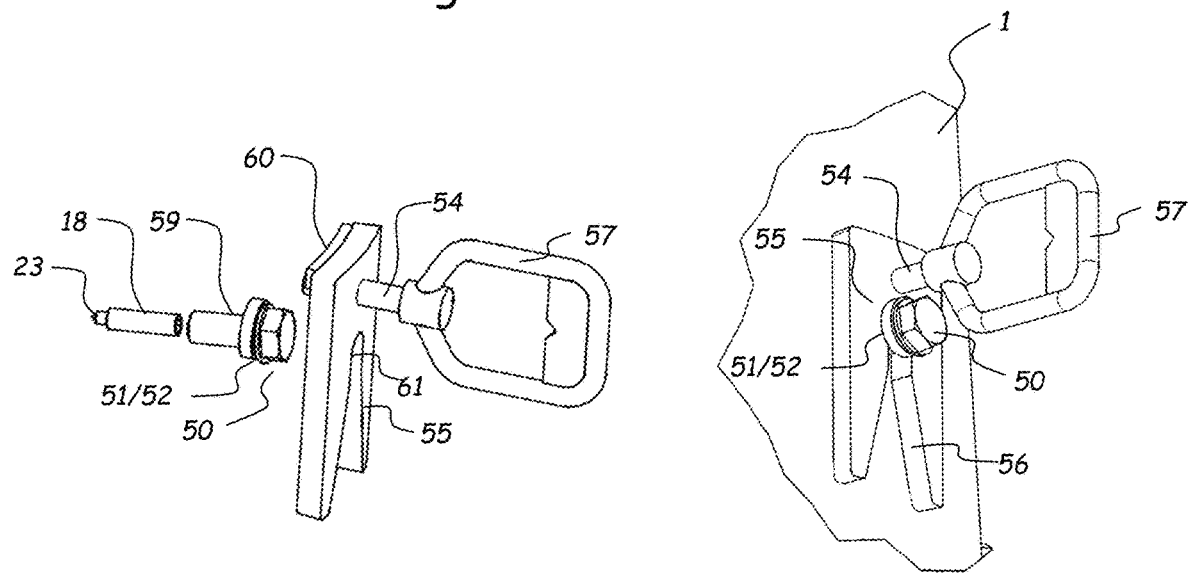
Fig 13
Fig 14

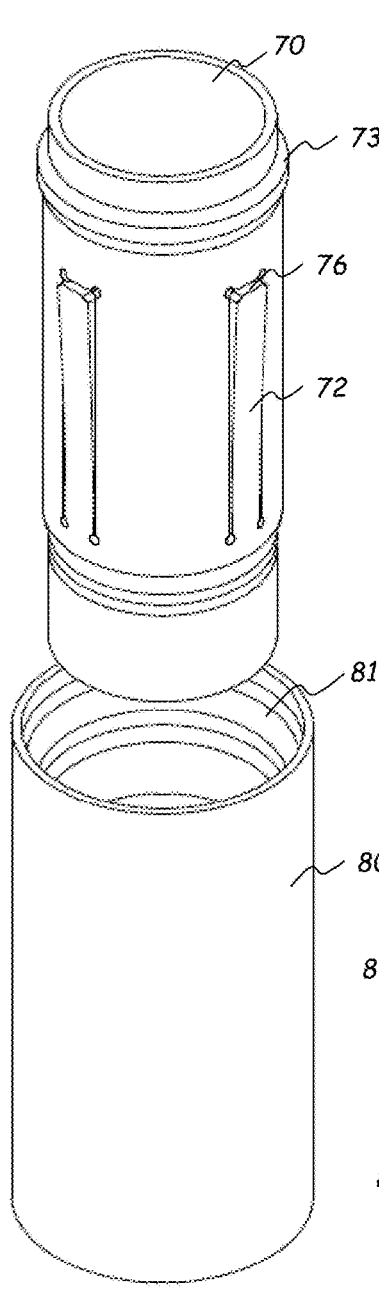
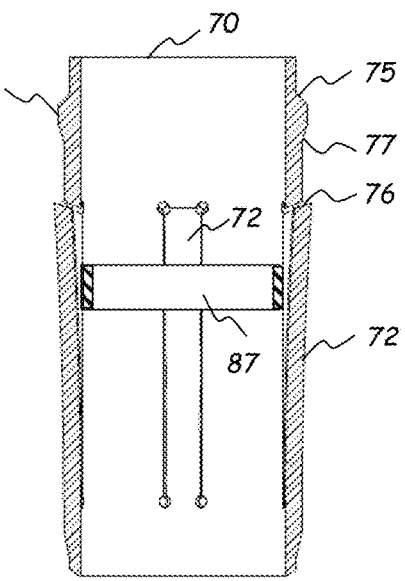
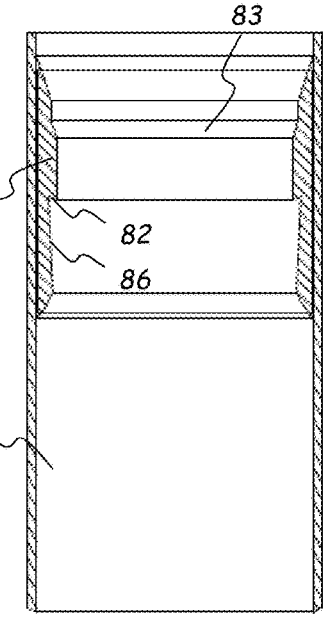
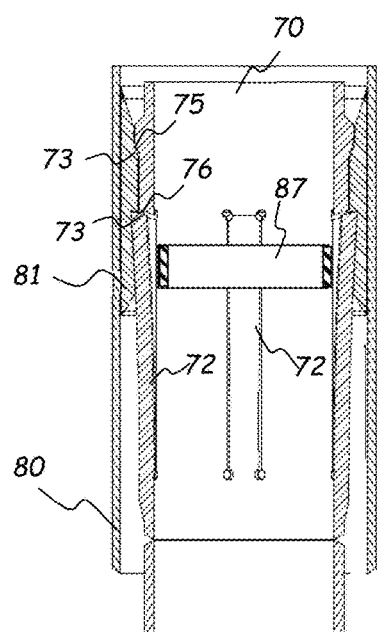
Fig 15
Fig 16
Fig 17
Fig 18

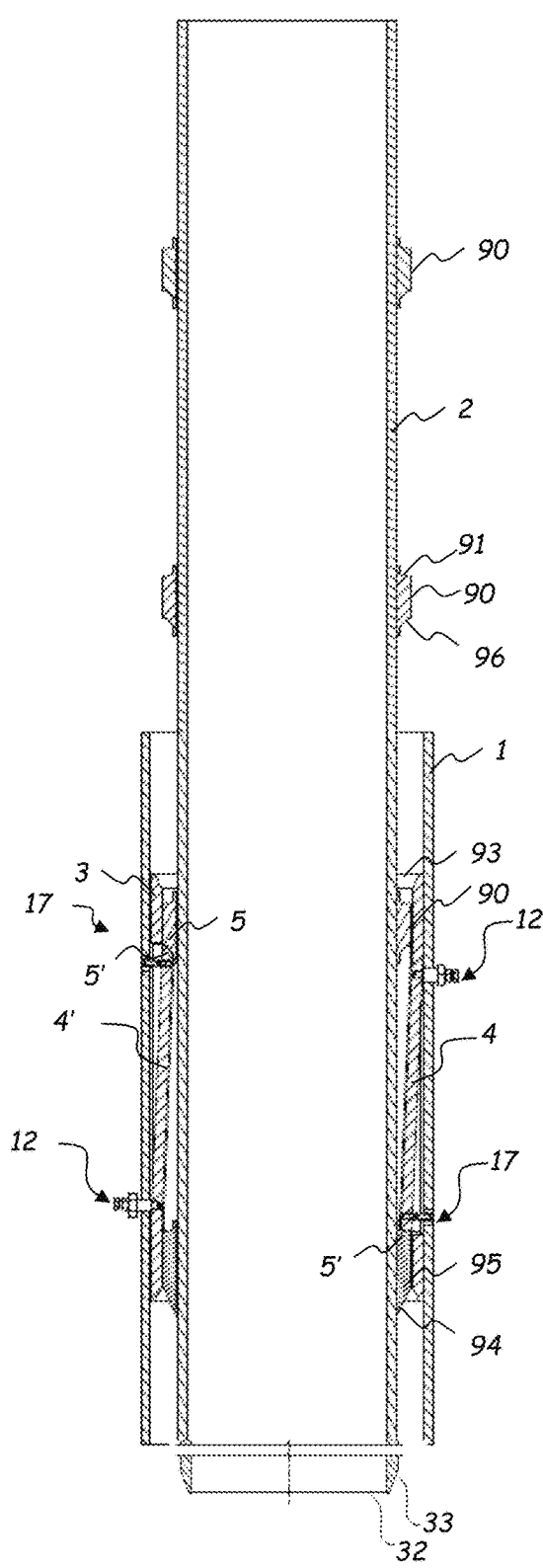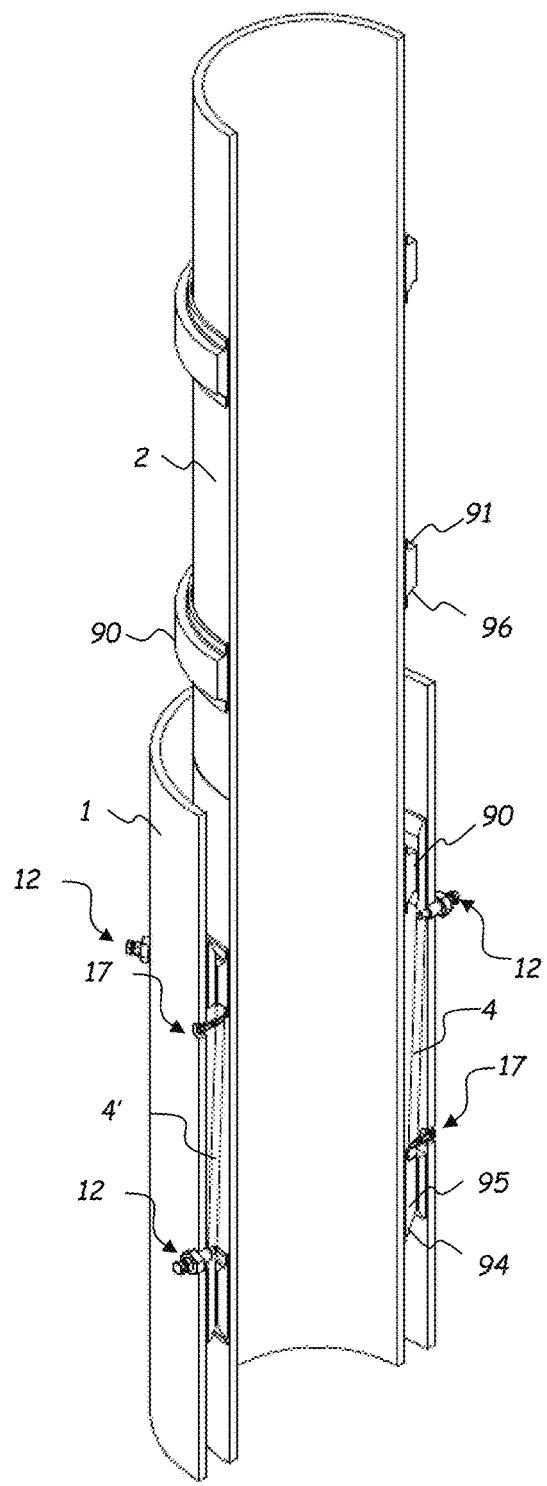
Fig 19
Fig 20

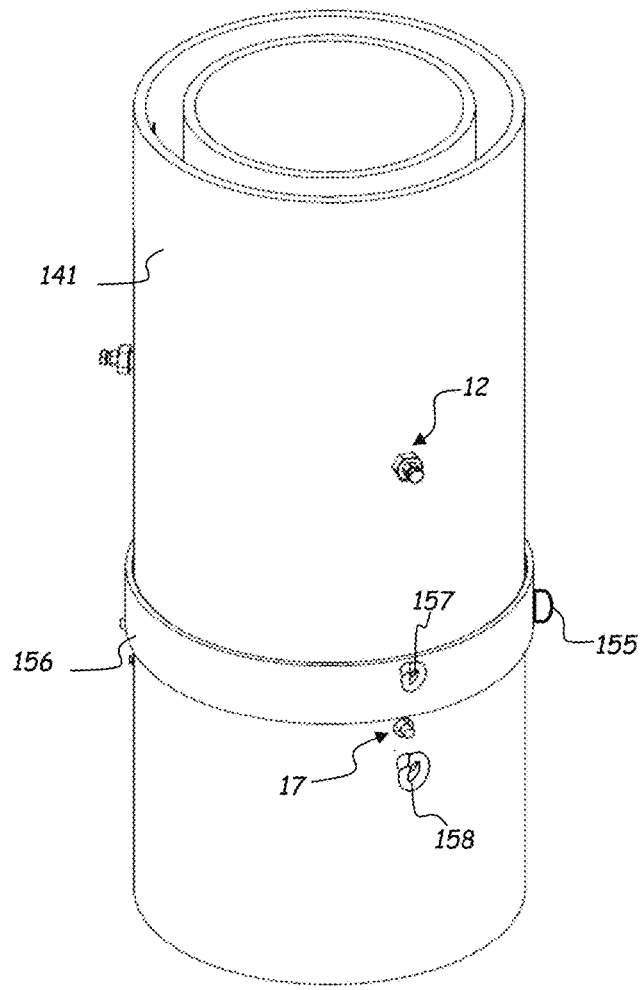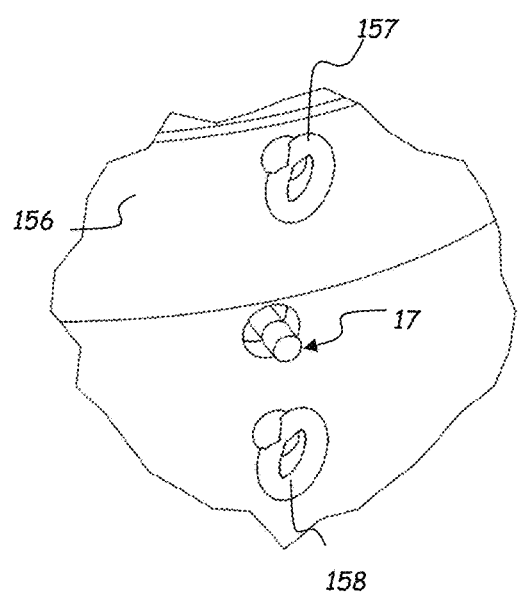
Fig 34
Fig 35

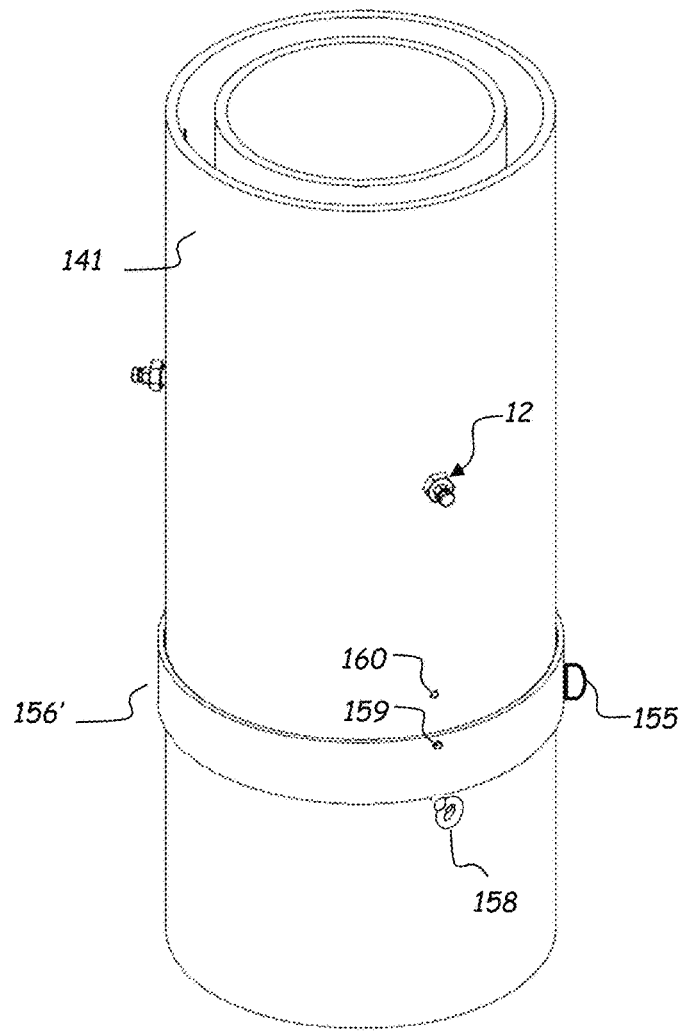
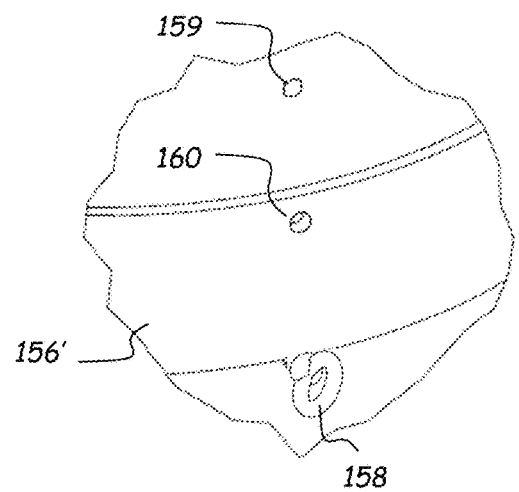
Fig 36
Fig 37

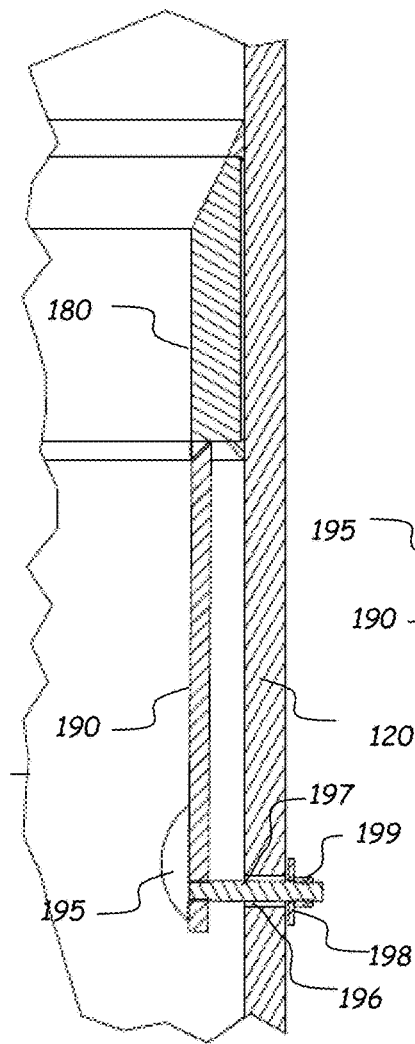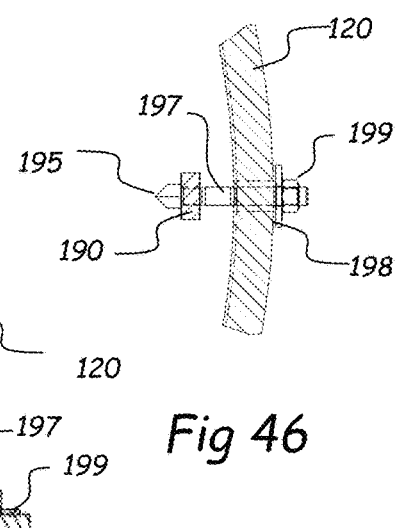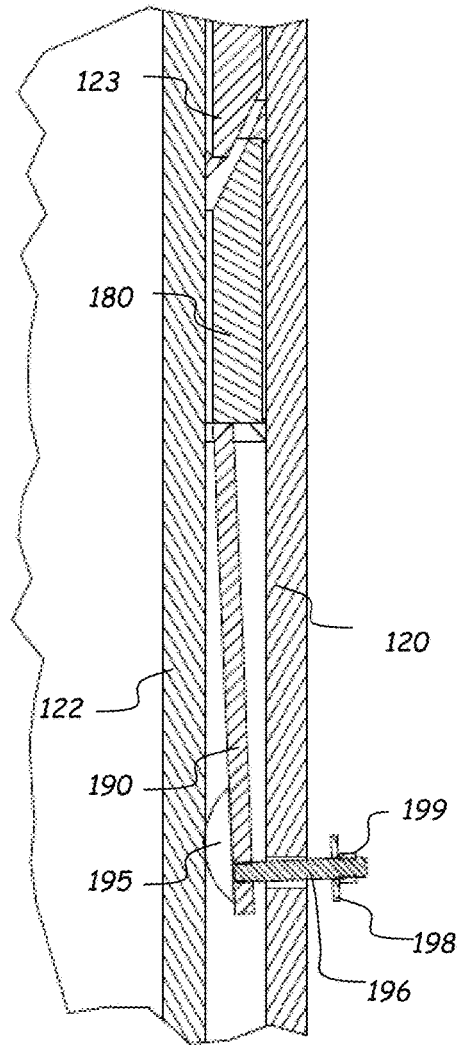
Fig 45
Fig 46
Fig 47

CANTILEVERED RESILIENT STRUT CONNECTOR

RELATED APPLICATIONS

This application is a national phase entry of International Patent Application No. PCT/GB2019/051744, filed Jun. 21, 2019, which claims priority from Great Britain Patent Application No. 1810943.9, filed Jul. 4, 2018, the entire disclosures of which are incorporated herein by reference.

The present invention relates to an arrangement for connecting structural members in a subsea or other (often harsh, remote) environment where manual intervention using personnel is difficult or impossible. For such a situation ideally a connection should be made automatically or with a minimum of effort using remotely controlled equipment. It is recognised that the avoidance of human intervention from the connection operation eliminates health risk and reduces cost.

In offshore applications there are several known methods of connecting piles to pile sleeves using a diverless method. More recently diverless techniques have included grouting, swaging or latching. A known latching technique is addressed in GB Patent GB2332256. This known latching method utilises a first member penetrating a second member. The second member utilises resiliently biased members in the form of rectilinear curved plates set in either one or both directions with hook shaped end features that engage with shaped recesses with abutment features on the first member. On engagement of the hook shaped end features into the respective recesses the connection provides resistance against both subsequent extraction or further penetration of the first tubular member via tension in the resilient member. This tension transfers along the length of the resilient members (resilient struts) back to the body of the second tubular member. The reliance of tension to transfer load in the known invention is referred to in the description and indicated on all drawings within the granted patent.

The joint arrangements discussed herein eliminates the use of tension members with hook shaped end features but in contrast utilises cantilevered initially displaced resiliently biased strut members, formed from the body of the first or second tubular member or alternatively formed from an attached collar, engaging with an abutment face or shaped notch on the first or second, respectively, tubular member. Once engaged load is transferred between the members via direct axial compression in the cantilevered resilient strut. It is recognised that compression members have an inherent instability concern that can dramatically limit the load carrying capacity of the member. The present invention overcomes this issue by minimising the buckling length and providing lateral restraint to the initially displaced resilient member whilst operating in a shape close to its initial displacement. Consequently the member is prevented from buckling out of plane (radially or tangentially) and therefor is able to carry a considerable load, far higher than a similar unrestrained compression member. Crucially the avoidance of the hook shaped feature eliminates the eccentricity and associated bending within the member that would otherwise require a far larger cross section. As a result a very compact and lightweight connector utilising such strut members may be used to considerable advantage.

A key advantage of the present design is the performance of compressive members under cyclic loading. It is well known that variations in compressive stresses due to cyclic loads are considerably less damaging than those experiencing tensile stress. The fatigue performance of the resiliently biased compression strut members are therefore much improved compared with an equivalent tension member and as a result the endurance of the connector is much enhanced. It should be noted, indeed, that common practice in structural engineering to ignore conditions of compressive stress when establishing fatigue endurance limits for an element. As fatigue loading is prevalent in typical connector design the advantage of using compression members (struts) are therefore significant.

In the present invention the initially displaced resilient biased members may be mounted directly onto the second member or be integral with and formed from elements cut from the second member or alternatively may be integral with and formed from a collar that is in turn mounted on the second member.

Similarly in the present invention the initially displaced resilient biased members may be mounted directly onto the first member or be integral with and formed from elements cut from the first member or alternatively may be integral with and formed from a collar that is in turn mounted on the first member.

In the joint arrangements discussed herein it is a preferred arrangement (although not necessarily always the case) that the resiliently biased member are pre-set in a deformed (displaced laterally) shape albeit unloaded. This pre-set shape corresponds to the engaged shape for the connector. In this way when additional axial loads are applied (once engaged) the resiliently biased member do not experience bending stresses (due to enforced deformation) but only stresses due to the compressive axial load being transferred. As a result, the resiliently biased member does not need to be sized to resist combined bending and axial load but axial load alone. The resulting member may therefore be thinner than it otherwise would be. Using a thinner resiliently biased member has significant advantages in that the stiffness of the member is reduced and as such the same lateral displacement may be achieved using a shorter member without overstressing that member. The overall benefit is a much lighter and thinner connector that utilises restrained struts (compression members).

The penetration of the first tubular member into the second tubular member causes the initially displaced resilient strut element to first move radially outward and largely occupy a gap within the second member (or collar if present) created by the formation of the resilient strut member itself (if the strut has been cut from the second member or collar). Once the first member reaches a pre-determined relative position with respect to the second member the radially displaced resilient strut element returns under its own elastic energy to occupy its initial position prior to penetration and thereby the connector becomes engaged. Once in this engaged position any reversal of the penetration (withdrawal) of the first member is prevented by the compressive load in the resilient strut member. Likewise any movement of the second member so as to reduce the extent of penetration of the first is also prevented by the compressive load in the resilient strut member.

Further penetration of the first tubular member is prevented by the leading edge of a collar (where present) mounted on the first member coming to rest against an abutment face incorporated into a collar (where present) mounted on the second member.

The initially displaced resilient biased members and the body or collar from which they are formed may, in the case of a tubular member, be created from plane cylinders that are subsequently profiled. In one arrangement, the resilient members may be created by forming a three sided cut. This allows the material bounded by the cuts to be radially displaced to form the desired resilient strut member shape. If moved radially outward by penetration of the member or attached collar the displacement of this resilient member would typically lie within elastic limits of the material and therefore when the radial load is removed, the collar recess aligns fully, the member would return to its the original cylindrical form. One arrangement is to create a permanent set or deformation in the member of an amount that suits engagement with the slot, recess or abutment face in the first member. This may be achieved by heating the resilient strut at or near its cantilevered attachment to the cylinder whist applying lateral load to the free end. As the material heats so the elastic modulus of the material reduces and the effective yield point of the material is similarly reduced. In this way the permanent set or deformation may be formed in the resilient member so that when once again at room temperature the required offset remains. This sets the initial displacement. Although we have described a 3-sided cut, the skilled person will be aware of other techniques that achieve the same or similar effect.

An alternative arrangement is envisaged whereby two sets of resiliently biased strut members are oriented so as to oppose one another. These may be cut from the same member or collar and nested so as to enjoy the same advantage. Were these nested resilient strut members be mounted on the second member then on the first member two opposing recesses or abutment faces would be required. These again may be set within a collar mounted and attached to the first member. In such an arrangement when the first member is inserted and penetrates the second member the leading edge of the collar mounted on the first member would by virtue of its sloping face displace the reverse facing resilient struts (facing in the direction opposite to the penetration) then in turn displace the forward facing resilient struts (facing in the direction of the penetration). The displacement of the two sets of resilient struts would be maintained until the shaped recesses in the collar (mounted on the first member) aligns with the ends of the resilient strut members at which point both sets of resilient struts would, elastically and therefore automatically, return to their initial positions and this would prevent further axial penetration of the first member and also any subsequent retraction or withdrawal of the first member. In effect the connector would prevent relative movement of the first and second members. It should be noted that unlike the earlier arrangement further penetration of the first member is prevented not by the leading edge of the collar mounted on the first member coming to rest against an abutment face incorporated into the collar mounted on the second member but by the resilient members in each respective direction.

This point is significant as for this arrangement the first set of resilient members may be retractable and as a result would allow the disengagement of the second member from the first and allow relative movement of the second member with respect to a stationary first member. Such movement would not be possible were the abutment face incorporated into the collar mounted on the second member exist as such a feature would prevent this.

It is recognised that the quantity of resilient biased members and their section and size will have a direct effect on the load carrying capacity of the individual strut and the connector as a whole. These variables may be adjusted to tailor the connector to the planned duty.

Likewise the typical cross section of the first and second member is shown as circular although the cross section could be square rectangular, hexagonal or any other consistent section that allows one to penetrate or mate with the other.

An additional arrangement allows a modified version to join members of equal section size in a form that the projecting element of the first member is arranged to penetrate the second member in such a way as the external surfaces of the members are flush after engagement. Such a connection allows compression to pass directly from the first to into the second member via direct bearing of the external surfaces against one another. Any tension in the two members would be transferred via the resilient biased members, again in compression.

The original concept as defined in GB Patent GB2332256 employed the broad principle taught by structural engineering that tension members or components are considerably more efficient than compression members as they avoid the issue of buckling instability. To cater for axial tension in the connection of two members a means to engage and safely transfer this axial load between the two is required. The original concept employs hook features attached to resilient members to facilitate this. When the tension load is applied the interlocking of the hook and abutment features occurs. These interlocking features not only provides a means for direct load transfer but also prevents end rotation of the resilient tension member. Due to the requirement of the inner member to penetrate the outer member without damage the fabrication tolerances must be allowed for. For this reason there is necessarily an annular clearance gap between the two members. As a result when the members move laterally due to this tolerance gap, whilst under tension, a significant bending moment is induced in the resilient members. This induced bending moment is typically high and dominates the section requirements of the resilient members leading to the requirement of a resilient member section size that is considerably larger than would otherwise be necessary due to tension alone.

In addition when engaging the two members there is a forced lateral displacement of the resilient members to allow the hook feature to pass over the abutments prior to engagement. The result is that the tension members must be set at a generous length to provide sufficient flexibility to accommodate such a lateral displacement.

Thus although the use of tension is, in principle, advantageous this introduces not only fabrication complexity in the form of hook feature but also leads to an increase in length and therefore weight and cost of the connector.

An additional significant consideration is that tension members are known to have limited endurance in respect to fatigue or cyclic loading. For example, connectors used for subsea structures to pile foundations are typically called on to provide good fatigue performance so such a consideration is often paramount.

Considerable detailed study of the original tension connector concept and component design led to a number of key observations:.
1) The hook feature induces high bending stresses in the resilient member. To manage these bending stresses whilst accommodating lateral displacements the resilient member requires a substantial length and this determines the overall connector length and fabrication cost
2) The fatigue performance of the component members and weldments are of interest due to these elements being under both bending and tension
3) The hook feature requires considerable detailed machining effort and welding costs A program of detailed investigation into the disadvantages of the original concept have led to the following conclusions that are in contrast with normal structural teaching or design approach.
1) The use of tension member design for the connector although in principle advantageous can actually be detrimental in that it requires a hook feature that in turn induces high bending stresses in the main resilient members. As a result compression members are indeed advantageous, contrary to basic structural engineering teaching
2) The use of compression members (resilient struts) obviates the need of the hook features used in the tension connector as the contact bearing between resilient strut and abutment may be aligned axially to permit load transfers directly via bearing contact
3) The resilient strut member may be restrained so as to prevent buckling instability and thereby have similar load carrying capacity as the equivalent tension member
4) Were the hook feature to be removed the induced operating bending would be eliminated allowing the length of the member to be reduced (as the length of the original concept resilient members was sized to introduce sufficient flexibility to control such bending).
5) This reduction in length leads to a shorter, lighter and more compact connector that is less expensive to fabricate and transport.
6) Removal of the hook feature allows the fabrication cost to dramatically reduce due to the reduction in complexity and elimination of machining/welding.
7) Were the hook feature to be removed the variable and cyclic bending stresses induced in the resilient member due to lateral movement would be eliminated and as such the fatigue damage caused would be prevented
8) The use of resilient struts rather than tension elements ensures the fatigue performance of the system is improved significantly as it is known that crack propagation, a governing consideration for fatigue endurance, does not apply to elements under compression It is a feature of the present invention that the struts work in compression to transfer load between the members. Furthermore, the struts act to resist withdrawal of the second member from the first member via compression in the strut. Thus, the struts are designed to resist compression.

Furthermore, the compression struts discussed herein are arranged to project inboard and/or outboard from the first and second member, respectively. In other words, an inboard projection refers to a projection towards the axis of a longitudinally aligned member, and an outboard projection refers to a projection away from the axis of a longitudinally aligned member. In preferred arrangements of the joint described herein, the so-called "second member" penetrates the "first member"—i.e. the second member is considered to be the member that is inserted into (i.e. within) the first member. It is therefore clear that the "inboard" and "outboard" terminology used to describe the radial/lateral displacement of a strut is in relation to the outer (first) member having an inboard projection towards the inner (second) member, and/or the inner (second) member having an outboard projection towards the outer (first) member. Without such configuration there would be no engagement between the members, since an outward projection on the outer (first) member would be away from the inner (second) member and likewise an inner projection on the inner (second) member would be towards the lumen of the inner (second) member and again would afford no interaction with the outer (first) member.

FIGURES

Various configurations of the joint arrangements discussed herein are highlighted in the attached figures in which:

FIG. 1 shows one configuration of the joint arrangement with an outer member with an inner member concentrically engaged within.

FIG. 2 shows one configuration of the joint arrangement with an outer member with an inner member concentrically engaged within.

FIG. 3 shows one configuration of the joint arrangement with an outer member with an inner member concentrically engaged within.

FIG. 7 shows an inner member concentrically engaged within the outer member in another configuration of the joint arrangement.

FIG. 8 shows an inner member concentrically engaged within the outer member in another configuration of the joint arrangement.

FIG. 12 shows an adaptation to an indicator arrangement in which an internally threaded bolt with bolt head may be threadably engaged with the indicator pin.

FIG. 13 shows an adaptation to an indicator arrangement in which an internally threaded bolt with bolt head may be threadably engaged with the indicator pin.

FIG. 14 shows an adaptation to an indicator arrangement in which an internally threaded bolt with bolt head may be threadably engaged with the indicator pin.

FIG. 15 shows an inner member concentrically engaged within the outer member in another configuration of the joint arrangement.

FIG. 16 shows an inner member concentrically engaged within the outer member in another configuration of the joint arrangement.

FIG. 17 shows an inner member concentrically engaged within the outer member in another configuration of the joint arrangement.

FIG. 18 shows an inner member concentrically engaged within the outer member in another configuration of the joint arrangement.

FIG. 19 shows an arrangement similar to that shown in FIG. 1 but having multiple collars attached to the inner member.

FIG. 20 shows an arrangement similar to that shown in FIG. 1 but having multiple collars attached to the inner member.

FIG. 34 shows a locking ring which can be incorporated into any joint arrangement.

FIG. 35 shows a locking ring which can be incorporated into any joint arrangement.

FIG. 36 shows a locking ring which can be incorporated into any joint arrangement.

FIG. 37 shows a locking ring which can be incorporated into any joint arrangement.

FIG. 45 shows various configurations whereby an electrical path can be created between the two members.

FIG. 46 shows various configurations whereby an electrical path can be created between the two members.

FIG. 47 shows various configurations whereby an electrical path can be created between the two members.

GENERAL DESCRIPTION

Figure 4:
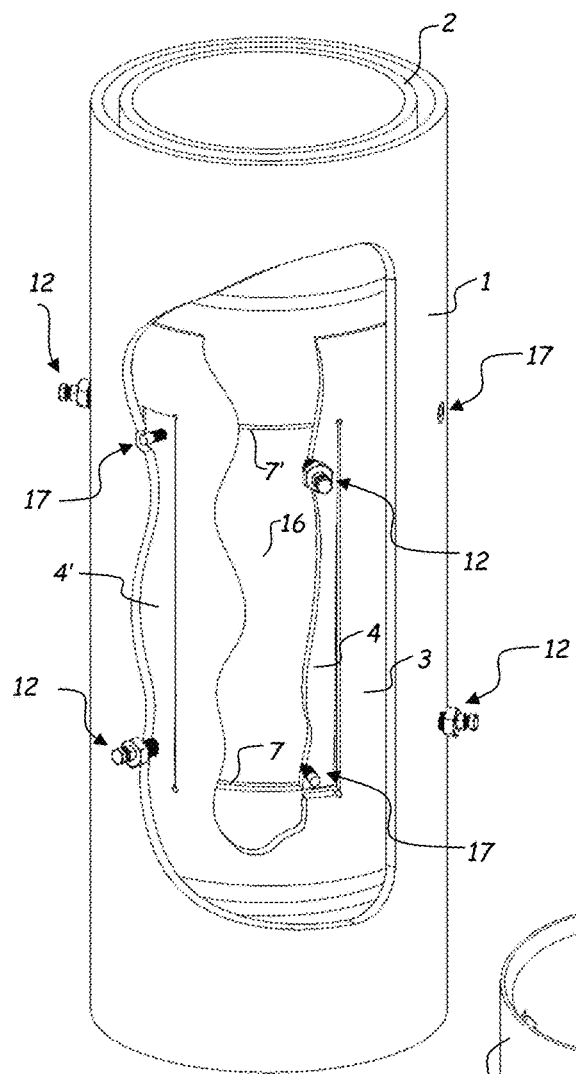
FIG. 4 shows the arrangement of FIGS. 1-3 in further detail.

In the following arrangements typically two members are connected by placing one concentrically inside the other. The connector is engaged via one or more cantilevered resilient struts on one member contacting an abutment face located on the other member. In each of the arrangements, as described, each member is shown as a tubular member and the pair of tubular members are arranged with longitudinal axes aligned. It shall be understood that the section shape, although shown as a tubular arrangement, are not restricted to such tubular arrangements. Many different cross-sections of the tubular members can be employed in the present invention, such as square, hexagonal, etc. The available variations will be well known to the skilled person. Furthermore the orientation of the axes for all arrangements, although shown vertical, is not restricted to the vertical. In addition the number of resilient struts and abutments may vary in both size, distribution and number from those shown and described in the arrangements and may be arranged in either or both directions and be formed from or attached to either member. The principle function of the resilient struts are to transfer load between the two members via axial compression. Associated secondary bending due to eccentricities and misalignments shall also be carried by the resilient struts, assisted if required by additional lateral supports that provide reaction to the lateral load component within the slightly inclined strut and effectively eliminates the bending stresses caused in the strut by the change in direction.

The profile of the contact faces between the resilient strut remote end and the corresponding abutment face may vary. The faces may be bluff or near perpendicular with the resilient strut or may be sloping to assist penetration of the member or may have a reverse slope to prevent release and or hold the contact face in a fixed orientation to prevent rotation of the resilient strut remote end once under load. In addition the contact face be may be shaped using reverse slopes or curves to assist engagement and or prevent inadvertent disengagement.

References to resilient struts relate to cantilevered plate elements that are formed from and integral with either the body of the inner or outer member, or from attached collars, whilst the abutment face or faces on the other member may form part of the other member or form part of an attached collar.

In each of the arrangements there is an axial movement direction that relates to penetration and an opposite direction movement relating to withdrawal. For most arrangements the intention is for the connector, once engaged, to resist movement in either axial direction. References to rings, collars or sleeves are interchangeable and relate to full circumferential elements.

In most arrangements the connector arrangement may be used to connect two members of different size that allow penetration of the smaller into the larger. The resilient strut or struts, attached to one member, permit unrestricted penetration of the second member, but once the desired penetration is achieved and the connector elements align, the resilient strut remote end engages with an abutment on the second member and thereby resists withdrawal of the second member via compression in the resilient strut. The resilient strut is typically set within the annular gap between the two members.

In the case where the two members are of the same or similar size a smaller diameter projecting element is attached to one member that penetrates the end of the second member. On achievement of desired penetration the two members ends contact each other and transfer axial load directly via compression. The projecting element in this case acts as the smaller member and penetrates the larger and engages in a similar manner with the resilient strut remote end (s) engaging with the abutment on the other member preventing withdrawal via compression in the strut members.

In the case of tubular members the resilient struts may be in the form of arcuate rectilinear springs cantilevering from the member body or attached collar. The opposite end or free end of the cantilever strut referred to as the remote end.

The descriptions may refer to direction of the resilient strut. Here the direction shall be understood as from the cantilevered end to the remote or free end. Upward and downward are as portrayed on the image views on the Figures although it is understood that the members may be at any orientation including reversed.

Movement of the remote end inboard or inward is in the direction towards the member axes and movement outboard or outward is the opposite.

Preferred arrangements of the present invention are as follows:

A connector for joining two longitudinally aligned members with the first member penetrating the second member and having at least one (optionally 1, 2, 3, 4, 5, 6) cantilevered resilient strut in the direction of penetration. In some arrangements there is also present at least one (optionally 1, 2, 3, 4, 5, 6) struts in a direction of withdrawal. The resilient struts can be integral with and formed from either the body of the first member or from a sleeve attached to the first member. Abutment faces are formed in either recesses of the second member or on collars attached to the second member. Initially, prior to penetration the remote ends of the cantilevered resilient struts can be laterally pre-displaced so as to interfere with the passage of the second member. During penetration the remote ends of the cantilevered resilient struts are able to move laterally back into the space created by their formation. Once the desired penetration is achieved the remote ends of the cantilevered resilient struts return to the pre-displaced positions and engage with the abutment faces on the second member. The engaged cantilevered resilient struts thereafter prevent further longitudinal movement, preferably in both the direction of penetration and withdrawal, via compression in the cantilevered resilient struts.

A connector for joining two longitudinally aligned members with the first member penetrating the second member and having at least one (optionally 1, 2, 3, 4, 5, 6) cantilevered resilient strut in the direction of penetration. The resilient strut can be integral with and formed from either the body of the first member or from a sleeve attached to the first member. An abutment face is formed in either a recess of the second member or on a collar attached to the second member. Initially, prior to penetration the remote ends of the cantilevered resilient strut can be laterally pre-displaced so as to interfere with the passage of the second member. During penetration the remote end of the cantilevered resilient strut is able to move laterally back into the space created by its formation. Once the desired penetration is achieved the remote ends of the resilient strut returns to the pre-displaced position and engages with the abutment face on the second member. The engaged cantilevered resilient strut thereafter prevents further longitudinal movement in the withdrawal direction via compression in the cantilevered resilient strut. Also once the desired penetration is achieved an additional abutment on the second member prevents further penetration of the first member by contact with an abutment face on the first member.

With any arrangement there may be at least one cantilevered resilient struts integral with and formed from either the body of the second member or from a sleeve attached to the second member and at least one abutment formed in either one or more recesses of the first member or on one or more collars attached to the first member.

A connector for joining two longitudinally aligned members of equal or similar size with the first member abutting the second member and having projecting elements penetrating the second member and having at least one cantilevered resilient strut in the direction of penetration. The cantilevered resilient strut can be (preferably is) integral with and formed from either the body of the first member or from a sleeve attached to the first member. An abutment face is formed in either a recess of the second member or on a collar attached to the second member. Initially, prior to penetration the remote ends of the cantilevered resilient strut can be laterally pre-displaced so as to interfere with the passage of the second member. During penetration the remote end of the cantilevered resilient strut is able to move laterally back into the space created by its formation. Once the desired penetration is achieved the remote ends of the cantilevered resilient strut returns to the pre-displaced position and engages with the abutment face on the second member. The engaged cantilevered resilient strut thereafter prevents further longitudinal movement in the withdrawal direction via compression in the cantilevered resilient strut. Also once the desired penetration is achieved the abutting member ends prevents further penetration of the projecting elements of the first member.

In any arrangement the one or more cantilevered resilient struts may be arranged in either or both axial directions and ideally be spaced regularly around the circumference of the members in a variety of numbers, sizes, widths, thicknesses and lengths and spacings to suit the requirements and duty of the connector.

In any arrangement the cantilevered resilient struts preferably have an indicator pin attached near its remote end the length of which may project to the outer face of the assembly via a hole set in the outer member so as to expose the pin for visual reference. This indicator pin can be adjustable in its exposed length to allow a visual reference of the position of the cantilevered resilient strut with respect to the outer member. This will allow the viewer to judge if the cantilevered resilient strut is in an engaged or disengaged status. The indicator pin can preferably have a threaded hole along its length to contain a locking screw at one end to fix the indicator pin in its preferred adjusted projecting length and also allow threaded bolt or attachment to be attached from the exterior of the assembly. This threaded bolt or attachment may be used to pull the cantilevered resilient strut to a desired offset or allow disengagement by external means. Cross holes in the indicator pin may receive transverse pins to be set thereby allowing the cantilevered resilient strut to be temporarily held in the disengaged position.

In arrangements of the invention, particularly those with indicator pins, the connector may also comprise a release arrangement whereby an extension feature to the indicator pin is shaped to assist a direct pull on the cantilevered resilient strut via a threaded bar.

In one arrangement the threaded bar by rotation creates a compression in the threaded bar and moves a shaped plate that bears against the extension feature delivering a pull to the cantilevered resilient strut and displacing it laterally. The shaped plate can preferably be tapered in one plane and can be vee shaped in the other to assist alignment and positioning of the plate between the extension feature and the external face of the outer member. The threaded bar preferably can have a suitable handle so as to assist rotation via an ROV or diver.

In one arrangement, the threaded bar is attached to a cam plate arrangement so that by rotation of the cam plate and contact with the external face of the outer member the threaded bar is tensioned delivering a pull to the cantilevered resilient strut and displacing it laterally. The cam plate or plates preferably has a round bar that passes through it and in turn through slots in shaped deflector or stiffener plats attached to the outer member. The slots allow not only rotation but also lateral movement of the round bar relative to the outer member. The handle may be removable and is attached via a ferrule or similar receptacle to an outer shaped plate that in turn is fixed to the cam plate or plates ensuring that the cam plate and the outer shaped plate rotates together with the handle. The arrangement allows the handle position to relate to the disengaged position and the engaged position.

In arrangements of the present invention the cantilevered resilient struts may be adjustably displaced to a desired offset position in both inboard and outboard directions and also provide positive lateral support to the cantilevered resilient strut via contact from the outer member. The dual function arrangement preferably has a first threaded bar or bolt attached threadably to the outer member and contacting the face of the cantilevered resilient strut. By rotating the bolt so the cantilevered resilient strut may both offer lateral support to the strut and also be used to adjust the strut position in an inboard direction. A second smaller diameter bolt or threaded bar may pass freely through a hole in the first bolt and attach threadably to the resilient strut. A hexagonal nut on the second bolt thread may be used to apply tension to the cantilevered resilient strut and move the resilient strut in an outboard direction. Such bolts may be arranged to suit ROV operation if desired.

The formation of the cantilevered resilient struts from the members or sleeves may have circular holes in each corner. These circular holes may be drilled either before or after the cuts are made and before or after the lateral offsets are induced. The circular holes have a dual function in that they both define the limits of the resilient strut and also during operation serve to reduce substantially the stress concentrations associated with abrupt changes in geometry and avoid hot spot stresses.

Grooves may be set into the cantilevered resilient strut and or near the abutment faces to assist in load distribution of the resilient struts and associated abutment faces. By deformation or closure of the grooves so the load distribution will be shared to other cantilevered resilient struts. This will help to better control uneven loading between the contact bearing areas due to geometric imperfections and imperfect alignment of the inner and outer members. The grooves may of varying number, depth, length and disposition to suit the requirements of the connector. The grooves may have parallel faces or shaped faces and may be filled with compliant material. The profile of the grooves may be adjusted to suit desired performance and the base of the groove may itself be profiled to reduce stress concentrations.

A locking arrangement is also provided whereby the cantilevered resilient struts may be prevented from being sufficiently displaced to permit disengagement of the remote end of the resilient strut from its respective abutment face. The locking arrangement may be in the form of a ring or sleeve that may be positioned to restrict lateral movement of the resilient strut. For example by reacting against the indicator pin (where present). The locking ring may be held in an inactive position then be allowed to or encouraged to move to an active (locked) position, then if desired moved to the previous or a further inactive permission by either gravity or an applied force.

There is also provided a joint arrangement for joining first and second longitudinally aligned members, said joint arrangement comprising:
  at least one strut arranged to project from at least one of said first and second longitudinally aligned members;
  said at least one strut comprising a proximal end attached to the member from which it projects and a remote (distal) end arranged to be displaced away from said member;
  said distal end arranged to abut a complementary stop in/on the other member when said second member penetrates said first member.

The joint arrangement can comprise:
  (i) at least one strut being formed from a sleeve (collar) that is attached to the first member and/or second member; or
  (ii) at least one strut being formed from the wall of the first member and/or second member.

The joint arrangement can comprise:
  (i) at least one strut being arranged to project away from the member from which it is attached such that on penetration of the second member into the first member the second member moves past the distal end of the strut before reaching the proximal end of the strut; and/or (ii) at least one strut being arranged to project away from the member from which it is attached such that on penetration of the second member into the first member the second member moves past the proximal end of the strut before reaching the distal end of the strut.

The joint arrangement can comprise a plurality of struts arranged on at least one of the members. The plurality of struts may comprise all struts projecting in the same orientation; or at least one strut projecting in an opposing orientation from at least one of the other struts.

When the plurality of struts comprise struts projecting in opposing orientations then preferably the opposing orientations comprise alternating directions of projections with the proximal and distal ends of each strut in alternating lengthwise configuration.

The joint arrangement of can comprise at least one strut being resiliently biased such that at rest (i.e. when not under stress) the distal end of said strut is displaced away from said member to which the strut is attached.

In such arrangement, preferably the at least one strut is cut from the member from which it projects, thereby creating a gap in the member which can accommodate the strut when said strut is pushed towards the member on penetration of the second member into the first member;

optionally wherein the at least one strut has a substantially circular hole in at least one corner, preferably both corners, at the base of the cut which forms the proximal end of the strut.

In some arrangements the complementary stop on which the distal end of the at least one strut abuts:

(i) is a recess in the other member; and/or
(ii) is a projection on the other member.

Optionally the complementary stop is formed from a collar attached to the other member.

In some arrangements, the member to which the strut is attached comprises an additional stop, said additional stop being configured to prevent said second member from further penetration into the first member.

In some joint arrangements at least one of the first member or the second member comprises a plurality of stops arranged at different longitudinal distances along the respective first or second member to allow for engagement at different depths of penetration of the second member into the first member.

In some arrangements, the second member has attached to it a third member, said third member being the member which penetrates the first member.

The joint arrangement can also comprise a support structure permitting said at least one strut to be adjustably displaced to a desired offset position in both inboard and outboard directions, said support structure further providing positive lateral support to the at least one strut via contact from the first member.

Optionally at least one strut further comprises grooves or slots set into the strut and/or near the abutment faces.

In some joint arrangements at least one of the at least one struts has an indicator pin attached near its remote (distal) end the length of which may project to the outer face of the first member via a hole set in the first member so as to expose the pin for visual reference.

Optionally the indicator pin is adjustable in its exposed length to allow a visual reference of the position of the strut with respect to the first member; optionally wherein the indicator pin has a threaded hole along at least a substantial part of its length to contain a locking screw at one end to fix the indicator pin in its preferred adjusted projecting length and also allow a threaded bolt or attachment to be attached from the exterior of the first member; and/or wherein said threaded bolt or attachment may be used to move the strut to a desired offset or allow disengagement by external means.

Optionally the indicator pin further comprises at least one cross hole to receive a transverse pin to be set thereby allowing the strut to be temporarily held in the disengaged position.

Some joint arrangements further comprise a release arrangement whereby an extension feature to the indicator pin is shaped to assist a direct pull on the strut via a threaded bar that by rotation creates a compression in the threaded bar and moves a shaped plate that bears against the extension feature delivering a pull to the strut and displacing it laterally.

Optionally the shaped plate is tapered in one plane and to be vee shaped in the other to assist alignment and positioning of the plate between the extension feature and the external face of the outer (first) member.

The joint arrangement may further comprise a release arrangement whereby an extension feature to the indicator pin is shaped to assist a direct movement (preferably pull) on the strut via a threaded bar that is attached to a cam plate arrangement so that by rotation of the cam plate and contact with the external face of the outer member the threaded bar is tensioned delivering a force (e.g. pull) to the strut and displacing it laterally.

Some joint arrangements can further comprise a locking arrangement whereby the at least one strut is prevented from being sufficiently displaced to permit disengagement of the remote (distal) end of the strut from its respective abutment face.

Optionally the locking arrangement is in the form of a ring or sleeve that may be positioned to restrict lateral movement of the at least one strut.

Figure 6:
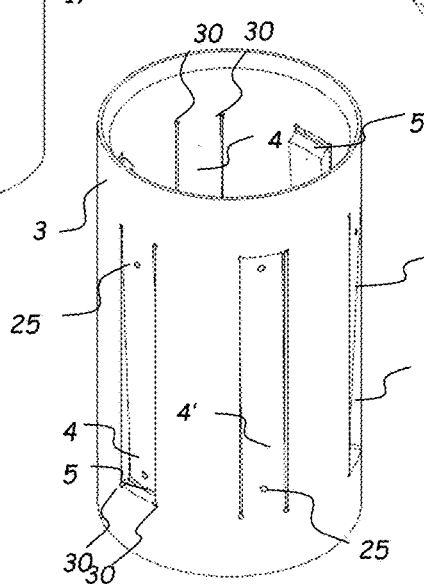
FIG. 6 shows the arrangement of FIGS. 1-3 in further detail.

An arrangement of the present system is shown in section in FIG. 1 and further detailed in FIGS. 2 and 3 shows an outer member (1) with an inner member (2) concentrically engaged within. A collar (3) is attached to the outer member to centralize the inner member with respect to the outer member. At least one upward pointing resilient strut (4') is formed from the collar and shaped so that the remote end (5') of the resilient strut projects inboard. Similarly at least one downward pointing resilient strut (4) is formed from the collar and shaped so that the remote end (5) of the resilient strut projects inboard. FIG. 6 shows the resilient struts in its initial displaced form. The inboard offset of both the upward and downward pointing resilient struts exist prior to penetration of the inner member and following engagement of the inner member. The penetration of the inner member within the outer member causes displacement of the resilient struts (4 and 4') and associated remote ends (5 and 5') outboard and on engagement the resilient struts return to their initial inboard offset position.

Figure 5:
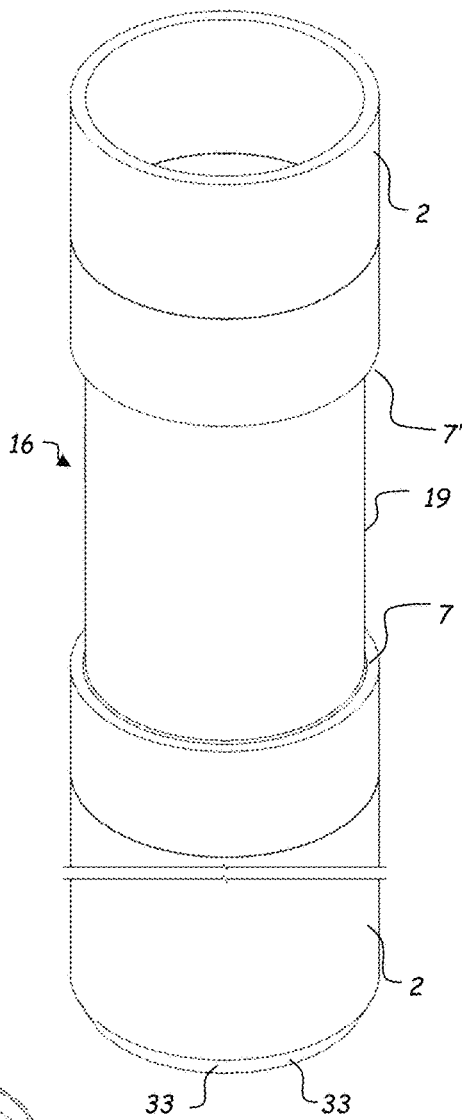
FIG. 5 shows the arrangement of FIGS. 1-3 in further detail.

Further details of the first arrangement are shown in elevation in FIGS. 4 to 6. FIG. 6 shows the collar (3) removed from the assembly. The collar (3) is typically attached, preferably via welding, to the outer member. FIG. 4 shows the inner member engaged within the outer member. FIG. 5 shows the inner member (2) with a shaped section of inner member (16) welded and integrated with the inner member. The shaped section of the inner member (16) is of similar external diameter to the inner member (2) and is either welded to or machined from the inner member. The shaped section of the inner member (16) incorporates a recess (19) that provides abutment faces at the bottom (7) and the top (7') of the recess. Once the inner member has penetrated sufficiently into the outer member the remote ends (5' and 5) of both upward and downward pointing resilient struts both align with the limits of the recess (19). Once aligned the remote ends of the biased resilient struts (5 and 5'), return to their original offset positions and the connection is then engaged.

The remote end of the upward facing resilient strut (5') may be profiled with a sloping or part sloping face to assist penetration of the inner member tip (32) whereby the sloping face (33) will push against the sloping or part sloping face (5') displacing resilient strut (4') outward. In this case the bluff face (5) of the downward pointing resilient strut (4) engages with the bluff face of the of the abutment (7) and the bluff portion (41) of the remote end of the upward pointing resilient strut (4') engages with the bluff portion (40) of the abutment face. In this way the free penetration of the inner member is permitted until the connector elements align and then once the remote ends of the resilient struts return to their original offset by movement into the recess (19) and the connector becomes engaged.

Once the connector is in the engaged condition further relative axial penetration is prevented by remote ends (5) contacting abutment face (7). Similarly retraction or reversal of the this axial movement is prevented by part remote ends (4') contacting part abutment face (40).

Should it be required that free axial movement be restored then the outward displacement of either all upward or downward facing resilient strut ends would be necessary depending on the desired movement direction. Outboard displacement of the resilient strut ends may be affected by pulling the indicator pin assembly (17) that in turns moves the resilient strut in the outward direction. The indicator pin assembly (17) has a dual role in that it both provides clear external visual indication of the position of the resilient strut but also allows a means to release the resilient strut from its engaged position by outward movement.

A lateral support arrangement (12) may be provided. This allows both fine adjustment of the offset of the resilient strut remote end and also to give lateral restraint to the strut thereby reducing or eliminating the bending in the resilient strut due to eccentric loading caused by the deformed shape change of direction in the resilient strut.

The status of the connector, engaged or not engaged, is not readily apparent from an external view. To overcome this, indicator pin assemblies (17), detailed in FIGS. 9 and 11 and described in the second arrangement, are attached to the resilient struts and are visible through a penetration in the outer member. The relative position of the indicator pin end with respect to the outer member surface then shows the radial offset of the resilient strut. Thus, for example, if the end of the indicator pin is projecting outside the surface of the outer member then this may indicate that the resilient strut is sufficiently offset to be dis-engaged with the abutment face whilst conversely were the indicator pin end to be not projecting then this may indicate the resilient strut is insufficiently offset and therefore engaged with the abutment face.

FIGS. 7 to 11 shows an inner member (2) concentrically engaged within the outer member (1). A collar (3) is attached to the outer member (1) to centralize the inner member with respect to the outer member. At least one resilient downward pointing strut (4) is formed from the collar and shaped so that the remote end (5) of the resilient strut projects inboard.

A second collar (6) is attached to the inner member to also centralize the inner member with respect to the outer member. An abutment face (7) forms a surface of the second collar to react load from the remote end of the resilient strut.

FIG. 8 shows the collar (3) removed from the assembly. The collar (3) is typically attached, preferably via welding, to the outer member.

A third collar (9) is attached to the first collar (3) and provides an upward facing abutment (10).

Figures 9, 10, 11:
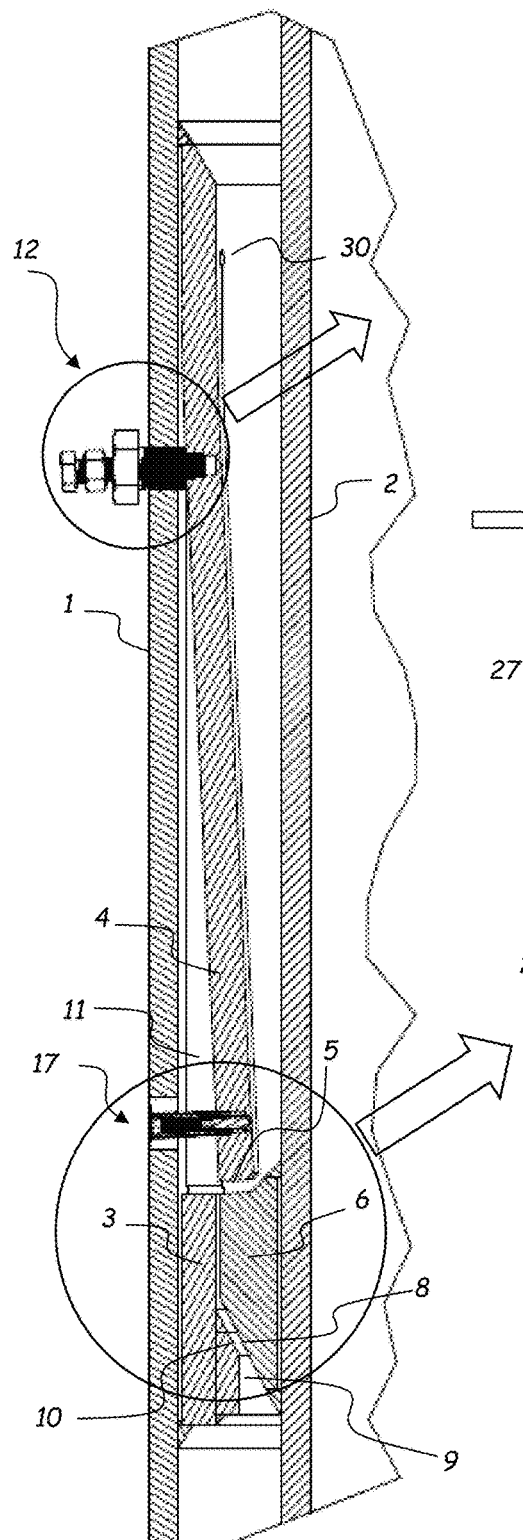
FIG. 9 shows an inner member concentrically engaged within the outer member in another configuration of the joint arrangement.
FIG. 10 shows an inner member concentrically engaged within the outer member in another configuration of the joint arrangement.
FIG. 11 shows an inner member concentrically engaged within the outer member in another configuration of the joint arrangement.

FIG. 9 shows a cross section through the assembly and shows the downward facing resilient strut (4) engaged with the second collar (6) that in turn is attached to inner member (2).

FIG. 10) show the lateral support assembly and adjustment feature that is provided to offer lateral support at the tangent point of the curved section of the resilient strut (4) and may also be used to adjust the radial offset of the remote end (5) to engage with abutment face (7).

FIG. 11 shows a larger scaled sketch of the remote end of the resilient strut along with the second collar (6).

The second collar also has an inclined surface at its base (8) that can come into contact with the upward facing abutment (10) of third collar (9) so positioned to limit the travel of the inner strut and associated second collar.

Thus when the inner member is aligned and penetrates the outer member the resilient strut(s) (4) is displaced outboard by the second collar (6). The resilient struts at this stage move radially outboard back into the opening (11), as shown on FIGS. 8 and 9, from which it has been formed from the first collar (3). The penetration of the inner member within the outer member and first collar until the abutment surfaces (8) and (10) come into contact. At this stage the second collar (6) has moved beyond the resilient strut (4) allowing the resilient strut to return to its initial displaced position. In this condition the two members are prevented from further relative axial movement by the two sets of contact surfaces (5 and 7) in the upward direction and (8 and 10) in the downward direction. The status of the connection in this condition is engaged.

It should be understood that the third collar (9) may not be a separate collar as shown but merely a thickening of the first collar (3).

As with the first arrangement a lateral support arrangement (12) may be provided. This allows both fine adjustment for the offset of the resilient strut tip and also to give lateral restraint to the strut thereby reducing or eliminating the bending in the resilient strut due to eccentric loading caused by the deformed shape and associated change in alignment of the resilient strut.

FIG. 10 shows a support arrangement (12) that may consist of a nested pair of threaded bolts. The larger of the bolts (13) is threadably attached to the outer member (1) and runs through to contact the outside face of the resilient strut. This larger bolt has a hexagonal head or similar to allow relative displacement between the outer member and the resilient strut. Control of this offset governs the offset of the tip of the resilient strut (4). Through this larger bolt passes a smaller diameter bolt (14) that is threadably attached to the resilient strut. Mounted on the smaller diameter bolt and threadably attached to the shank is a hexagonal head nut (15) or similar. The resilient strut and its remote tip may be moved inward by rotating the head of the larger bolt (13). Conversely by first rotating the bolt head (13) contact between the tip of the bolt and the resilient strut may be avoided. Then by holding the head of the smaller bolt (14) and rotating the hexagonal head nut (15) the resilient strut and its remote tip may be moved outward. The positioning of this support may be at any position relative to the base of the resilient strut but ideally at the tangent point of the curve of the strut. With the restraint provided at or near the tangent point of the resilient strut change curvature the eccentricity effects of the axial load with respect to the resilient strut is minimised. The reaction generated in the support arrangement will pass directly to the outer member via the threaded connection between the member and the larger diameter bolt.

A resilient strut position indicator arrangement (17) may be provided. This allows the lateral position of the resilient strut tip to be known and visually recorded whilst viewed from outside the outer member. The indicator arrangement may consist of a threadably engaged indicator pin (18) that is attached to a point near the remote end or tip of the resilient strut. The indicator pin will be visible through a hole (20) in the outer member. The pin to have a hex head or allen head, or similar, (28) at its external end to allow the pin to be tightened into the tapped hole (25) or alternatively loosened to allow removal. The indicator pin shall have a threaded hole along its central axis (21). Inside this threaded hole a smaller diameter threaded boss (22) with a pointed end (23) and an allen head or cross cut or similar at the outer end (24) to allow locking of the threaded boss end (23) against the end of the tapped hole (25) of the resilient strut. This locking detail is to ensure the indicator pin, once set, remains secure. The indicator pin shall have at least one transverse holes (26) drilled perpendicular to the axis to allow L shaped retaining pins (27) to be used to keep the indicator pin in a retracted position. This will allow retraction of the inner member whilst the resilient struts (4) are displaced and flush within the first collar (3). A cap (29) may be used to seal the transverse holes (26) to prevent improper access to or inadvertent loosening of the indicator pin via rotation of the pin head (28). The location of the indicator pin may be highlighted by a surface mark (31) on the outer member.

An adaptation to this indicator arrangement may be made to allow outward radial movement of the resilient strut so that the strut is no longer engaged or contacting with the abutment face. When all such struts are displaced the complete connector is disengaged and once again axial relative movement between the two members is possible. FIGS. 12 to 14 show such an adaptation in which an internally threaded bolt (59) with bolt head (50) may be threadably engaged with the indicator pin (18). Once attached to the indicator pin the bolt head (50) and associated spherical washer set (51/52) presents a shoulder that sits outside the face of the outer member (1). Between this shoulder and the outside face of the tubular member a curved shaped plate (55) may be lowered to sit against the internally threaded bolt (59). The curved shaped plate has a taper (56) providing a narrow opening at one end (61) and wider opening at the remote end. As the plate is offered into the gap so the plate centralizes over and eventually contacts the surface of the threaded bolt (59). The curved shaped plate has a similarly curved spacer plate (60) that provides a small offset between the shaped plate and the outer surface of the outer member. Through the curved shaped plate a threaded rod (54) passes and engages threadably through the curved shaped plate (55) allowing the end of the threaded rod (54) to contact the outer surface of the outer tubular member (1). By rotating the ROV friendly handle (57) the threaded rod (54) pushes against the outer member and causes the curved shaped plate (55) to move away from the outer member. In so doing it draws the threaded bolt (59) and associated indicator pin (18) and attached resilient strut (4') outward thereby disengaging the resilient strut remote ends (5 or 5') from the abutment face (7 or 7'). By reversing this activity the resilient strut would be allowed to reengage.

Prior to the formation of the resilient struts a circular hole (30) in FIG. 8 may be cut in the first collar (3) delineating the extremities of the shape of the struts. This shall assist with the creation of the strut and represent the start of the cuts and also importantly result in the reduction of stress concentration in at the corner locations.

It is appreciated that due to fabrication tolerances the inner member and outer member and associated collars must include dimensional allowances to allow penetration. This leads to imperfect axial alignment and small relative inclinations of the two members once engaged. Due to these small inclinations distribution of the loads for the resilient struts are not perfectly equal and one strut may be loaded higher than others. To help better distribute these loads a pliable material may be used at the contact faces between the remote ends of the resilient struts and or the abutment faces. Alternatively a system of cuts or grooves may be employed as shown on FIG. 11. These grooves may be made on the resilient strut ends (48 and 49) and or the abutments (46 and 47). The number, size, depth and spacing of the grooves may be adjusted to provide more or less contact flexibility. It is appreciated that the cut or cuts may be set from the inside or outside faces of the contact elements.

An alternative or additional arrangement is shown in FIGS. 15 to 18. With this arrangement the inner member (70) may be concentrically placed within the outer member (80). A shaped collar (81) is attached to the outer member (80) to centralize the inner member with respect to the outer member.

FIG. 16 shows the inner member alone with at least one resilient upward pointing strut (72) formed from the first collar and shaped so that the remote end (76) of the resilient strut (72) projects outboard.

The shaped collar (81) includes an abutment face (82) that provides reaction to the remote end (76) of the resilient strut (72).

A second collar (73) is either attached to or forms part of the inner member (70) and provides an abutment (77) that engages with a second abutment face (83) on the shaped collar (81) and limits the travel of the inner member whilst penetrating the outer member.

FIG. 18 shows the inner member engaged with the outer member and with upward facing resilient strut remote ends (76) engaged with and contacting the shaped collar first abutment face (82).

At the limit of penetration of the inner member within the outer member the resilient struts (72) return to their initial offset and the upward facing tip of the resilient strut (77) contacts the first collar abutment face (82). This represents the connector in the engaged position whereby further relative axial penetration is prevented by sloping abutment face (77) of the inner member contacting second abutment face (83) on the shaped collar (81). Similarly retraction or reversal of the this axial movement is prevented by remote ends (76) contacting the abutment face (82) also of shaped collar (81).

The lower profile of the shaped collar (81) may be short or extended (86) as shown in FIG. 17. The extended collar (86) may be shaped to follow the path of the resilient strut whilst in the initial offset position that corresponds to the connector in the engaged status. By doing this the resilient strut is not able to buckle out of plane in the outboard direction and by avoiding a buckling condition the maximum axial carrying capacity is achieved. Similarly to prevent buckling of the resilient strut in the inboard direction a restraint ring (87) may be fixed to the inside face of the inner member, typically by welding. It is appreciated that the length of the extended collar (86) and the size and number of restraints ring (87) may be modified to suit axial load capacity requirements.

As with previous arrangements the status of the connector may be confirmed with the use of similar indicator pins (not shown) mounted on the inside face of the resilient struts that would be visible from inside the inner member. As with previous arrangements resilient strut remote end adjustment assemblies (not shown) may be also used. Such features may be fixed to the restraint rings (87). Similarly a release assembly may be mounted on such a restraint ring or sleeve (not shown) to move the resilient strut remote ends inboard and thereby disengage the inner member from the outer and permit reversal of the penetration.

An alternative or additional arrangement is shown in FIGS. 19 and 20. This arrangement is similar to the first arrangement but has multiple collars attached to the inner member (2) rather than a recess set within the inner member.

With this arrangement the inner member (2) may again be concentrically placed within the outer member (1). A collar (3) is attached to the outer member to centralize the inner member with respect to the outer member. At least one upward pointing resilient strut (4') is formed from the collar and shaped so that the remote end (5') of the resilient strut projects inboard. Similarly at least one downward pointing resilient strut (4) is formed from the collar and shaped so that the remote end (5) of the resilient strut projects inboard. The inboard offset of both the upward and downward pointing resilient struts as are present prior to penetration and engagement of the inner member. The penetration of the inner member within the outer member causes displacement of the resilient struts (4 and 4') and associated remote ends (5 and 5') outboard and on engagement the resilient struts return to their initial inboard offset position.

Multiple shaped collars (90) are attached to the inner member or formed from the recesses in the inner member to centralize the inner member with respect to the outer member and to provide multiple abutment faces for the remote ends to contact. With this arrangement it is possible for the connector to engage at a range of alternative relative penetrations. It shall be noted that the typical collar (90) provides an upper abutment face (91) suitable for engagement with downward pointing resilient strut remote end (5) and lower abutment face (96) suitable for engagement with upward pointing resilient strut remote end (5').

The spacing of the shaped collars (90) are to suit the length of the resilient struts in that the intervals for engagement are determined by the relative vertical offset of the respective remote ends. The lowest collar (95) has only a single upper abutment face and this determines the limit of penetration that permits engagement for the arrangement. The lower face (94) of the lower collar (95) has a sloping face to assist in penetration of the inner member through the outer member. Similarly the upper face (93) of the collar (3) has a sloping face to assist passage of the tip (32) and associated sloping face (33) of the inner member (2) during penetration.

As with other arrangements the external indicator pin assemblies (17) may be present along with release assemblies (not shown) to retract the resilient struts. Similarly the lateral supports and adjustment features for the resilient struts (12) may be present.

FIGS. 21 to 26 show this fourth arrangement with an alternative release assembly (100) operating in this example on the upward facing resilient struts. This release assembly is an alternate release method to that indicated in FIGS. 12 to 14.

Figure 23:
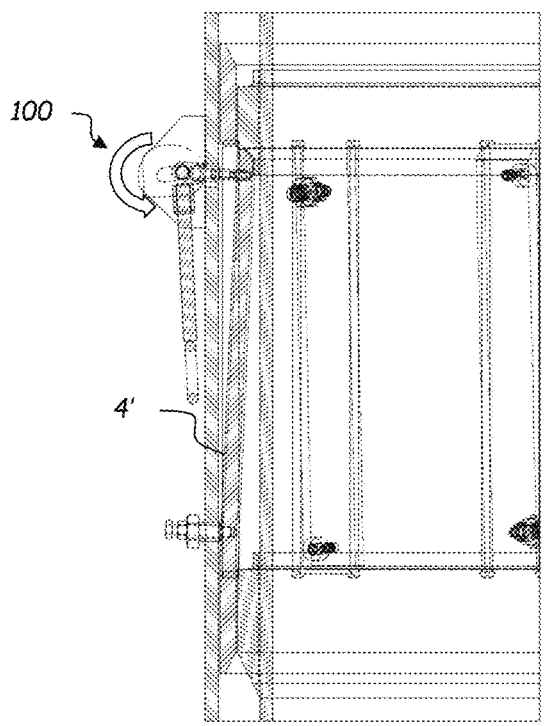
FIG. 23 shows the arrangement of FIGS. 19-20 with an alternative release assembly.
Figure 24:
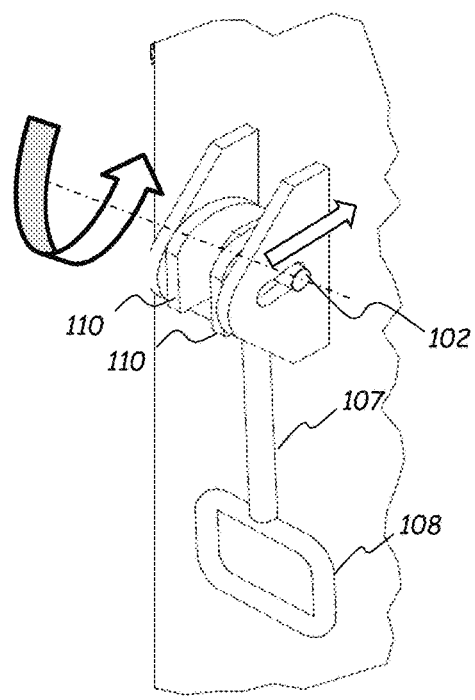
FIG. 24 shows the arrangement of FIGS. 19-20 with an alternative release assembly.
Figure 26:
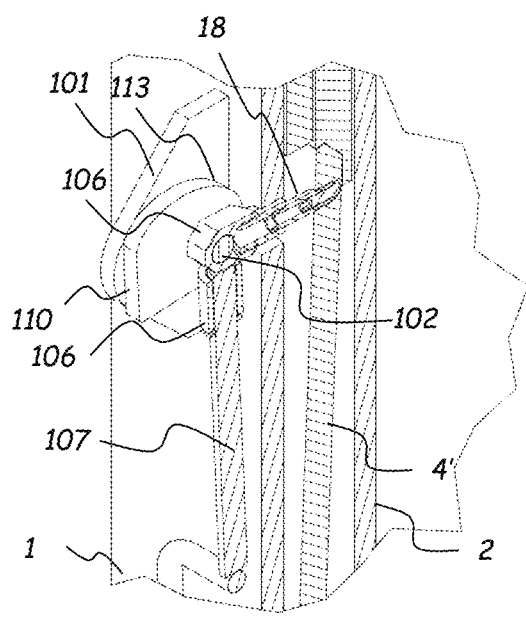
FIG. 26 shows the arrangement of FIGS. 19-20 with an alternative release assembly.

FIG. 23 shows a cross section through the connector with the inner member aligned and the resilient strut engaged with the outer member. FIG. 24 shows an external isometric view and FIG. 26 shows a partial sectional isometric view of the same.

Figure 21:
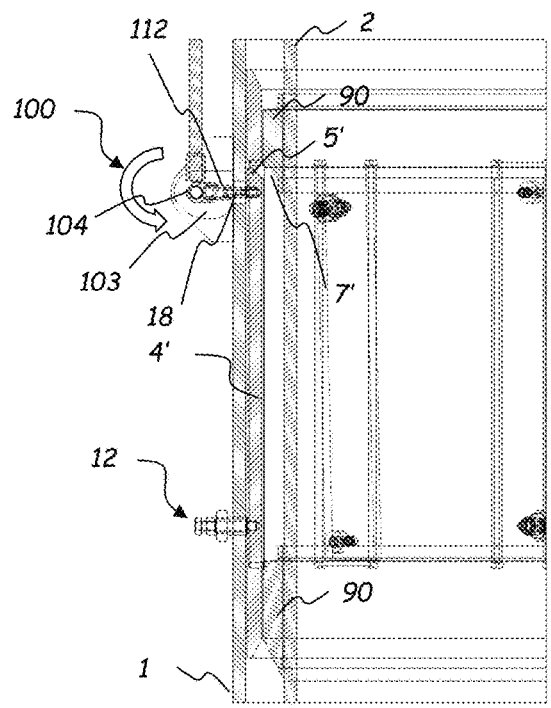
FIG. 21 shows the arrangement of FIGS. 19-20 with an alternative release assembly.
Figure 22:
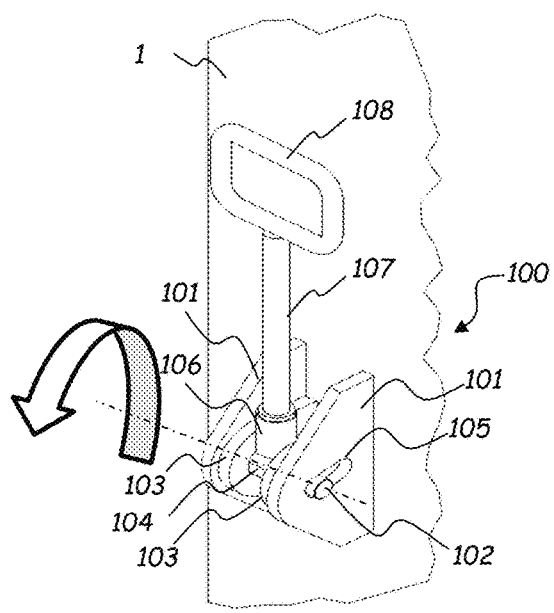
FIG. 22 shows the arrangement of FIGS. 19-20 with an alternative release assembly.
Figure 25:
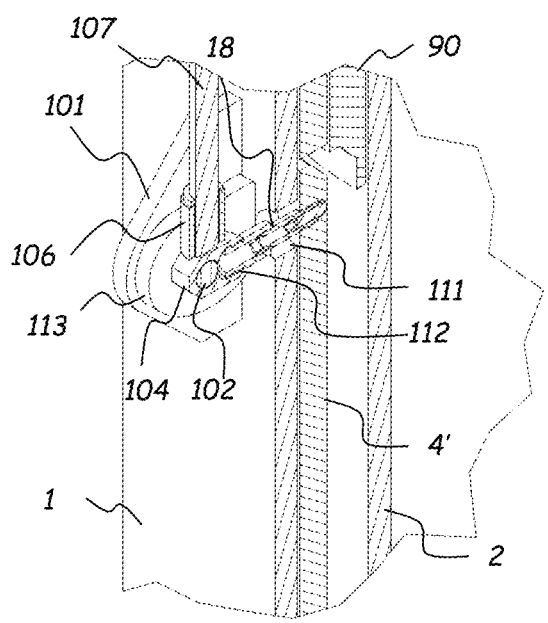
FIG. 25 shows the arrangement of FIGS. 19-20 with an alternative release assembly.

FIG. 21 shows a cross section through the connector with the inner member aligned and the resilient strut disengaged with the outer member. FIG. 22 shows an external isometric view and FIG. 25 shows a partial sectional isometric view of the same.

The release assembly employs cam plates. The cam plates consist of a shaped profile that incorporates a flattened section (110) more distant from the axis of rotation and a curved profile section (103) closer to the axis or rotation.

A shaped shaft (104) is fixed to and moves with the cam plates. The assembly (100) is attached to the external face of the outer member using two deflector/hinge plates (101) with slotted holes (105). A circular pin (102) passes through the shaped shaft (104), the cam plates (103) and the slotted holes (105) of the hinge plats (101). The cam plates at all times are in contact with the outside surface of the outer member (1). The shaped shaft (104) has a receptacle (106) mounted on it suitable for receiving a fixed or removable cam operating handle (107) with associated grab bar (108). In so doing the axle pin (102) rotates within the slot (105) and by the cam plate reacting against the outer member surface moves along the slot. As the cam rotates and the axle pin is forced along the slot so the attached extension pin (112) moves the indicator pin (18) through the opening (111) in the outer member (1) and in so doing moves the remote end (5') of the resilient pin (4') with respect to the abutment face (7').

An initial condition is shown in FIGS. 21 and 22 representing the disengaged condition for the connector. Here it is shown that the flat section of profile (110) is in contact with the surface of the outer member (1). In this example by anticlockwise rotation of the cam plates the curved surface (103) will be brought into contact with the surface of the outer member and due to the bias of the resilient strut the resilient strut will move inboard and this is accommodated by the axle (102) moving inboard along the slot (105).

After approximately 180 degrees of rotation the condition is as shown in FIGS. 23 and 24 and this represents the engaged condition. Due to the bias of the resilient strut its natural at rest position is to be in the engaged position with resilient strut remote end tip (5') in contact with the abutment face (7'). Thus in FIG. 23 the engaged condition is shown with the cam plate having the flat surface (110) facing outboard and the shaft or axle pin (102) at the minimum offset from the outer member at the inboard extremity of the slot (105).

The reverse operation may of course be employed to once again dis engage the connector.

At any stage the operator handle may be detached from the receptacle (106) and be removed.

Figure 27:
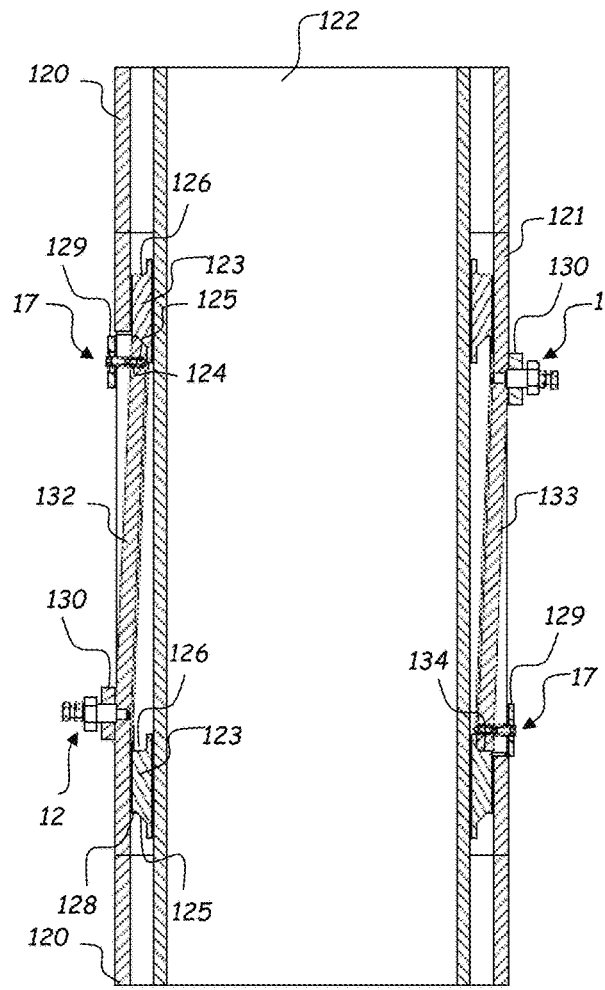
FIG. 27 shows an inner member concentrically engaged within the outer member in another configuration of the joint arrangement with resilient struts arranged in both longitudinal directions.
Figure 28:
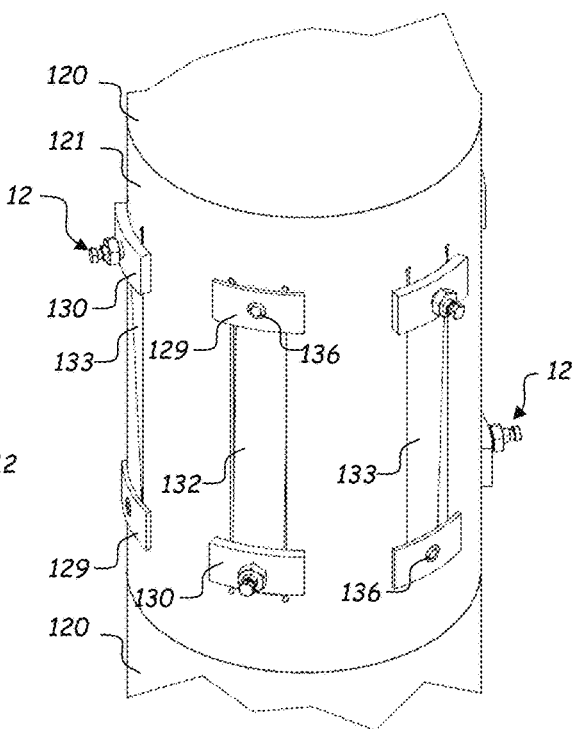
FIG. 28 shows an inner member concentrically engaged within the outer member in another configuration of the joint arrangement with resilient struts arranged in both longitudinal directions.
Figure 29:
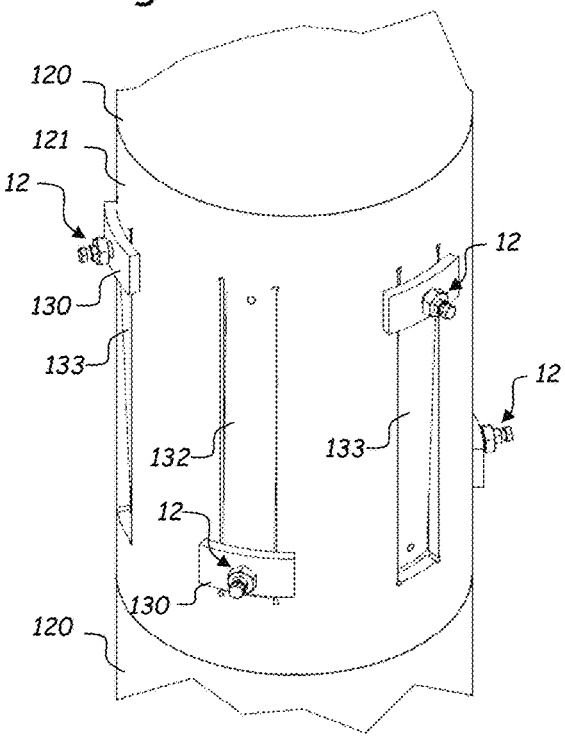
FIG. 29 shows an inner member concentrically engaged within the outer member in another configuration of the joint arrangement with resilient struts arranged in both longitudinal directions.

An alternative or additional arrangement is shown in FIGS. 27 to 29. This arrangement has resilient struts (132 and 133) arranged in both longitudinal directions. It is similar in function to the first arrangement but the resilient struts are not formed from a collar attached to the outer member but formed from the outer member itself (121). The outer member (121) may be integral with or attached to the outer member (120). The inner member (122) is shown with collars (123) attached to the inner member with upper abutment face (126) and lower abutment face (128 and 125). As with previous arrangements the upper abutment faces (126) and lower abutment face (128 and 125) offer reaction to resilient struts (132 and 133) via remote ends (124 and 134) respectively once engaged.

As with first arrangement the resilient struts may have indicator pin assemblies (17) and lateral support and adjustment assemblies (12). Again release assemblies may also be provided.

In order to attach lateral support and adjustment arrangements (12) to the outer member (121) a shaped plate (130) may be attached to the outer member through which the lateral support and adjustment assembly may operate. Similarly a shaped plate (129) may be attached to the member against which the end of the indicator pin (136) may be visually indexed.

Figure 30:
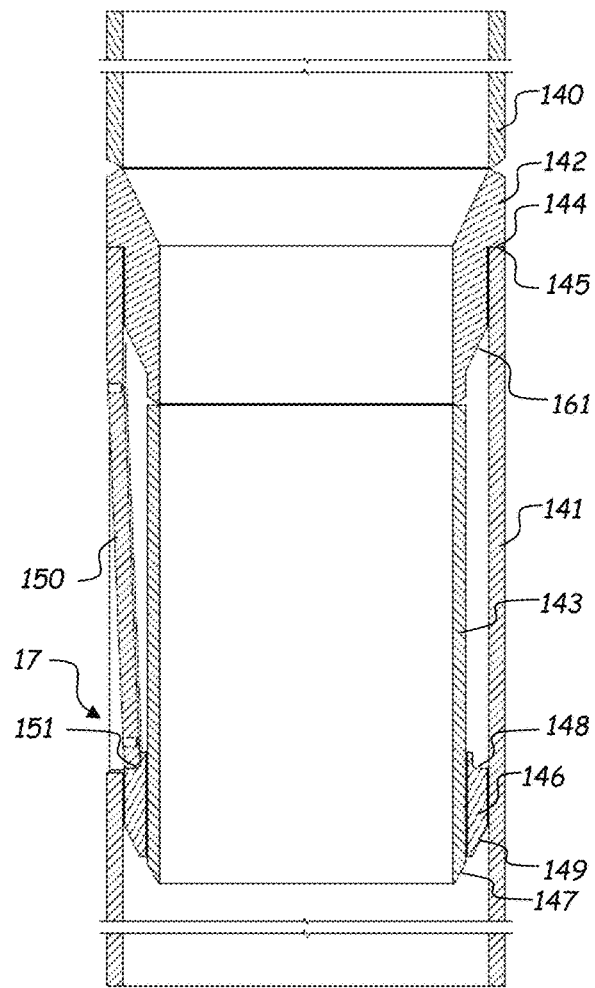
FIG. 30 shows an alternative configuration of the joint arrangement.
Figure 31:
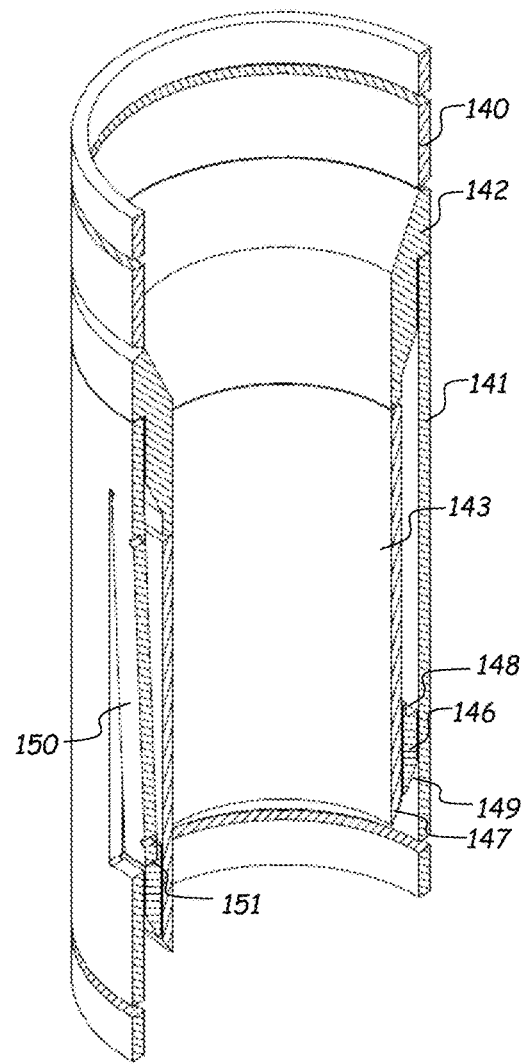
FIG. 31 shows an alternative configuration of the joint arrangement.

An alternative or additional arrangement is shown in FIGS. 30 and 31. This arrangement is similar in function to the previous arrangements but the two members have the same or similar size so the members are able to butt against one another rather than the inner member penetrating the outer member.

Projecting elements (142 and 143) are fixed to first member (140), these elements penetrate the second member (141) and are engageable but the outer surface of the two members rather than penetrate each other they bare directly against one another at their contacting surfaces (144 and 145). In this way the axial compression in one member is transferred directly to the other but not external tension. Externally applied tension may be transferred from one member to the other using resilient strut or struts (150), in axial compression, via contact of the resilient strut remote end (151) bearing against abutment face (148) of shaped collar (146) attached to projecting element (143). The leading faces of the projecting element (147), shaped collar (149) and sloping face (161) assist penetration of the projecting element (143) past leading edge (145) and into the second member (141).

In this arrangement the resilient strut(s) (150) are formed from the member (141).

As with first the fifth arrangement the resilient struts may have indicator pin assemblies (not shown) and lateral support and adjustment assemblies (not shown). Again release assemblies may also be provided.

Again as with the fifth arrangement a lateral support arrangements (not shown) to the resilient strut (150) maybe provided. For this a shaped plate (not shown) may be attached to the outer member (141) via which the lateral support and adjustment assembly may operate. Similarly a shaped plate (not shown) may be attached to the outer member (141) member against which the end of the indicator pin (not shown) may be visually indexed. Again release assemblies may also be provided.

Figure 32:
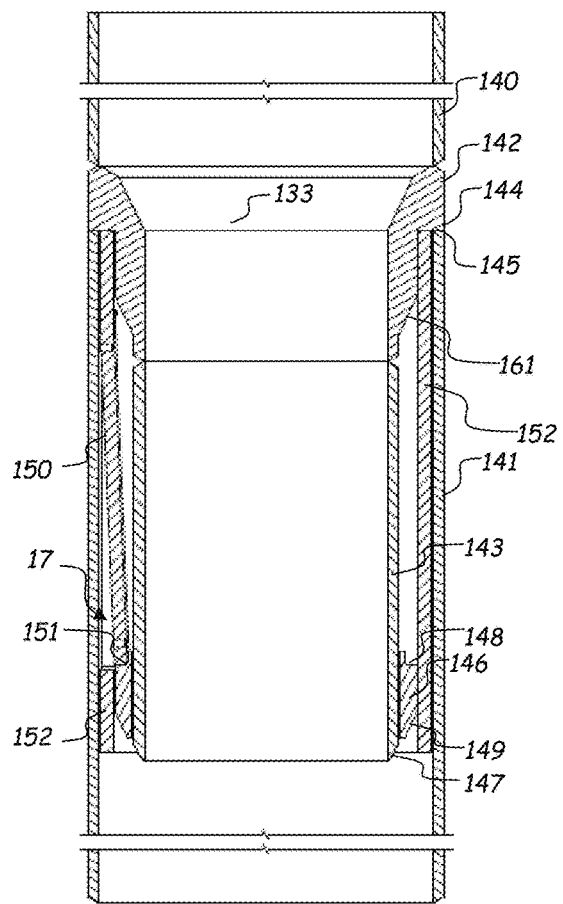
FIG. 32 shows a configuration of the joint arrangement similar to that shown in FIGS. 30-31 but the resilient struts are formed from a sleeve or collar attached to the member.
Figure 33:
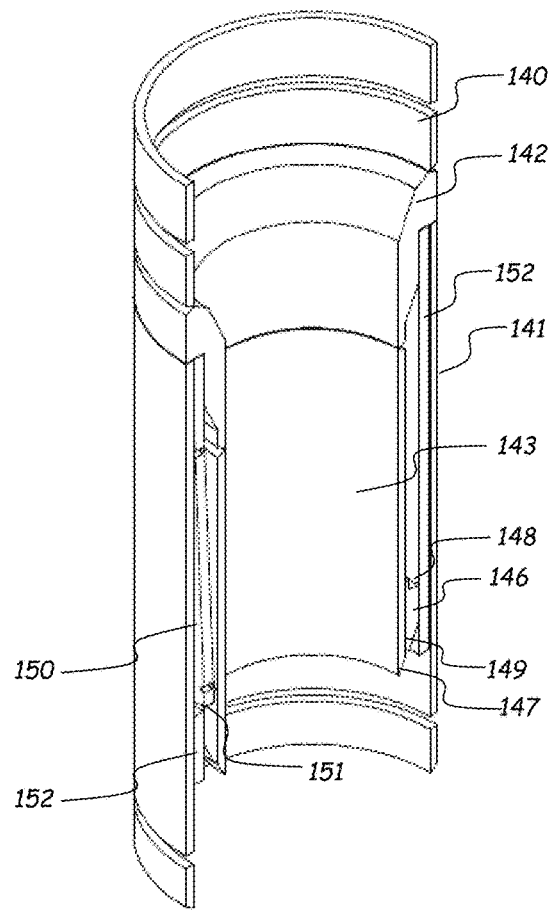
FIG. 33 shows a configuration of the joint arrangement similar to that shown in FIGS. 30-31 but the resilient struts are formed from a sleeve or collar attached to the member.
Figure 38:
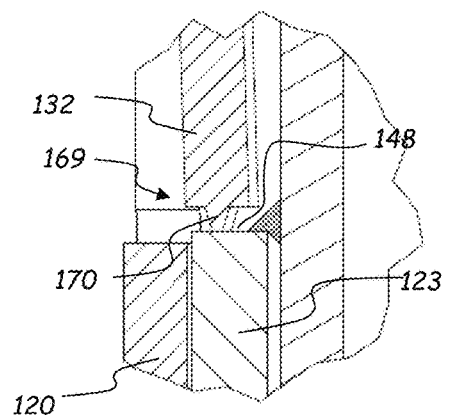
FIG. 38 shows another configuration of the joint arrangement with an outer member with an inner member concentrically engaged within.
Figure 39:
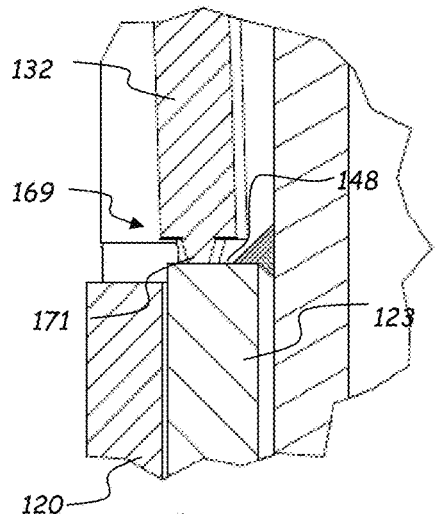
FIG. 39 shows another configuration of the joint arrangement with an outer member with an inner member concentrically engaged within.

An alternative or additional arrangement is shown in FIGS. 32 to 33. This arrangement is similar to the sixth arrangements but the resilient strut(s) (150) are formed not from the member (141) but from a sleeve or collar (152) attached to the member (141).

A locking ring may be incorporated in this or any other arrangement as shown in FIGS. 34 to 37. The locking ring (156) is a full circumferential sleeve or collar that is able to slip up and down the outer member (141), either under gravity or by applying a force to handle (155). When aligned with the indicator pin assembly (17) the locking ring will prevent the indicator pin from projecting outside the outer member and as such the resilient strut is unable to displace outboard sufficiently to allow disengagement from the abutment face.

The locking ring (156) may be held in position in the unlocked position as shown in FIG. 34 using one or more retaining pins (157) that penetrate the outer member via suitable holes (159) penetrating the locking ring and further hole or holes (160) penetrating the outer member. One or more additional retaining pins (158) may also be used at a lower elevation again via similar holes as a restraint to prevent the locking ring (156) falling past the engagement position for the locking ring.

When desired, the upper retaining pin or pins (157) may be removed. This will allow the locking ring (156) to fall under gravity or be pushed using handle (155) until it contacts the second or lower retaining pin (158). As shown in FIG. 36 the lower retaining pin or pins keep the locking ring in the lower position (156') and aligned with the indicator pin assemblies (17) and effectively locks the connector in the engaged position as they restrict outward movement of the indicator pin and any inadvertent release of the connector.

Should, at a later time, it be desired to disengage the connector the lower pin or pins (158) may be removed. This will allow the locking ring (156) to fall further, either under gravity or again by applying load to the handle (155) so that the indicator pin assemblies (17) may once operate and allow the pin head to again project outside of the outer member (141) and thereby permit disengagement of the connector.

Further arrangements of the system disclosed herein are now discussed. The skilled person will understand that the arrangements can be alternatives to, or be combined with, the one or more of the other arrangements disclosed herein in technically feasible ways.

Due to the fabrication tolerances of the first and second members it is necessary to allow for a gap between the two to ensure penetration is unrestricted. In the case of tubular members this annular gap can result in a potential misalignment between the two member longitudinal axes. In the case of a vertical connector arrangement this misalignment can result in a relative inclination between the two members. The members pass axial load from one to another via contact points between the members. The contact points can include the resilient strut tips, the collar or recess bearing faces, etc. The inclination will inevitably cause such discrete load transfer points to contact each other at various stages of penetration and as a result contact loads will not necessarily be evenly shared.

In recognition of this a bearing feature in the form of a projection or rail can be employed. This can be located at any position along the abutment face of the resilient strut and/or the complimentary face of the collar, and can extend a portion or substantially the whole or the whole of the length of the face. In preferred arrangements the rail is (approximately) centrally located in the width of the abutment face. Preferably the rail has a cross section smaller than that of the strut. The local bearing transfer capacity of the rail is chosen such that at a given level of load the rail will deform by a pre-determined amount. Such deformation will cause load to be shed to the remaining contact points. The next highest load rail will then be further loaded until it, in turn, deforms and sheds additional load to the remaining rails. In this controlled way the load is distributed more evenly. The object of this is to ensure that the local bearing rail failure load is less than the resilient strut axial capacity thereby the premature axial collapse of an individual strut is avoided. As the load is increased so progressively the local deformation of the rails increase and thereby accommodate the relative inclination or misalignment of the two members.

It is understood that the rail, although shown in the figures as a single rail on the resilient strut, may be a multiple rail and likewise may appear on the resilient strut or the collar. The shape and cross section of the rail may be modified to meet particular load resistance and deformation performance. The rail or rails may be tangential or radial with respect to the axes and may be added to either or both the resilient strut tip and the reaction or bearing face recess or collar.

One particularly useful rail arrangement is a single rail set approximately at the centre of the resilient strut. This will ensure that regardless of contact alignment with the collar or recess bearing surface it will result in concentric load with respect to the resilient strut body. The avoidance of eccentricity and associated induced bending stresses is known to detract from the load carrying capacity of compression members.

Figure 40:
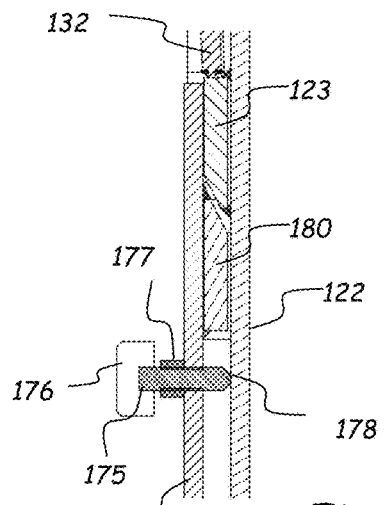
FIG. 40 shows another configuration of the joint arrangement with an outer member with an inner member concentrically engaged within.
Figure 41:
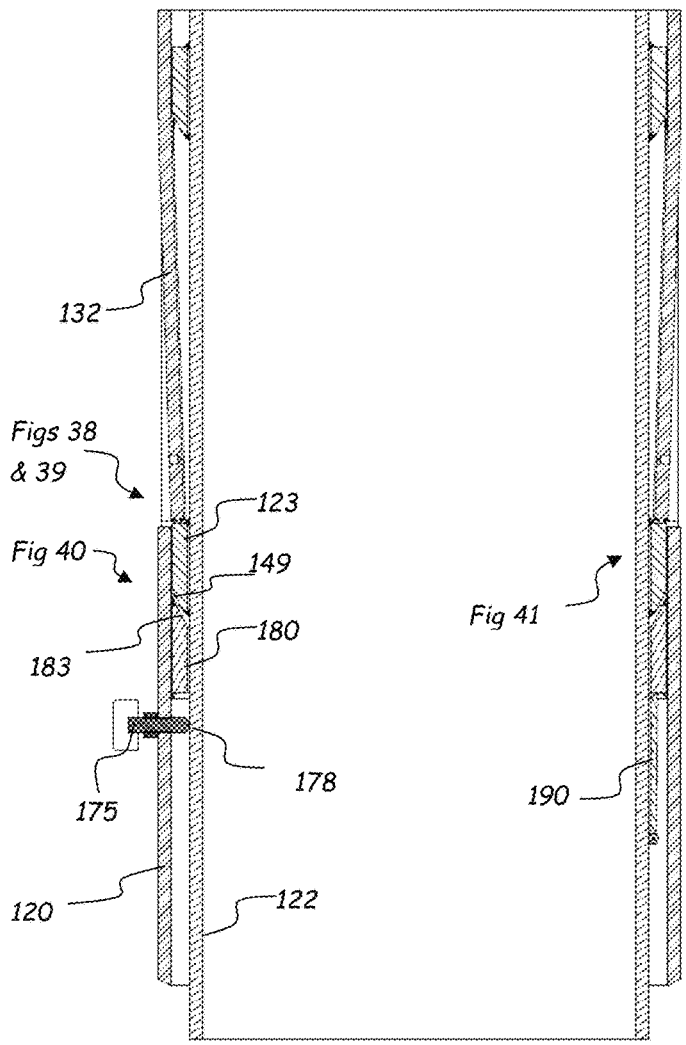
FIG. 41 shows another configuration of the joint arrangement with an outer member with an inner member concentrically engaged within.
Figure 42:
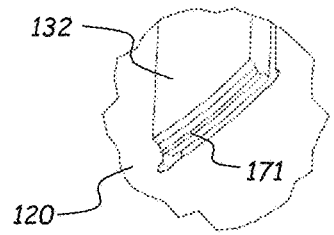
FIG. 42 shows another configuration of the joint arrangement with an outer member with an inner member concentrically engaged within.

As shown in section in FIG. 41 and further detailed in FIGS. 38, 39, 40 and 42 shows an outer member (120) with an inner member (122) concentrically engaged within. A shaped collar (180) is attached to the outer member to centralize the inner member with respect to the outer member and assist guidance during penetration of the inner member through the outer. At least one downward pointing resilient strut (132) is formed from the outer member (120) and shaped so that the remote end (169) of the resilient strut projects inboard towards the inner member. The remote or distal end of the resilient strut shows a bearing rail (171). The bearing rail may be any convenient or suitable profile that utilises a reduced cross section compared to that of the strut body and as a result provide a lower compression resistance strength than that of the strut body itself. In this way the load to be transferred by the resilient strut may be controlled or limited by the deformation characteristics of the bearing rail detail. The contact between the rail profile (171) against the bearing surface (148) of the inner member collar (123) will initially transfer load elastically and as load increases it may experience local yielding and associated deformation. Where there are more than one resilient strut such local deformation would effectively result in load being shed to the other resilient struts until a balance of load resistance versus local deformation is reached in all. This local rail profile and associated deformation is intended to occur in a controlled and geometrically stable manner that will ideally protect any one individual resilient strut (132) from general buckling failure. The profile of the bearing rail (171) can be selected to ensure rail deformation is sufficient to accommodate the anticipated axial misalignment of the inner and outer members caused by tolerances due to fabrication and associated axial inclination. This deformation causing controlled load sharing between the multiple points of bearing contact around the perimeter of the inner and outer members. Ideally the position of the bearing rail shall be central with respect to the resilient strut (132). In so doing the load within the resilient strut shall be largely concentric with respect to the strut axis and therefore avoid inducing significant bending moment within the strut that would otherwise restrict its load carrying capacity.

Once the inner member is fully penetrated into the outer member such that outer member supported shaped collar (180) (where present) contacts the inner member supported shaped collar (123) (where present) then resilient strut (132) will return to its initial position and the members will be engaged preventing free axial movement in either direction.

On engagement any further significant withdrawal or reverse axial movement of the inner member thereafter will be resisted by either the axial compressive resistance in the resilient strut bearing rail (171) versus the bearing face of collar (123) or collar face (183) to collar face (149).

It should be recognised that as with earlier described arrangements the resilient struts may alternatively be used in a reversed arrangement and likewise the resilient struts may be formed from the inner member with shaped collars supported by the outer member providing reactions. Equally the resilient struts may be formed from a collar that itself is attached to the outer or inner member and further that the bearing faces may be incorporated into a groove within the members rather than as an abutment face on respective shaped collars.

In one arrangement there is provided at least one bearing rail centrally disposed on each compression strut to both ensure the axial load is applied concentrically about each strut centroid and by local deformation of the rail to promote better load distribution between disproportionately initially loaded struts and the remaining struts.

In some arrangements the bearing rail being may be of a height, cross section and material property to provide a preferred axial load versus deformation performance. This deformation performance may be used to limit the retained load within the initially loaded strut to within the axial buckling capacity of the strut whilst shedding the balance of the initial load to the remaining struts. In so doing this better distributes the total axial load across all struts and assists in accommodating unequal initial loading due to axial misalignment of the inner and outer members and also due to fabrication tolerances In a subsea environment the cathodic protection of the interconnecting members (the first and second member) is a consideration. One objective is to ensure that the surfaces of the members are electrically connected to the anode material. This applies to both the inner and the outer connecting members. To ensure benefit of cathodic protection is available the two members need to be connected in a way that allows a current to flow between them.

There are a number of solutions to achieve a reliable electrical contact between the two members. This may be achieved using an ROV operated bolt that is attached to the outer member and by rotating a threaded bolt contact is made with the inner member via direct physical contact. The tip of the bolt may be shaped with a sharp point or a volcano shaped tip that allows a small amount of penetration of the bolt tip into the surface of the inner member, passing through any surface corrosion layer. This provides a reliable metal to metal contact and thereby a reliable electrical contact is ensured.

The above, although effective, requires intervention of an ROV and rotation of the threaded bolt. To avoid such an operation by introducing an automatic form of contact would be beneficial as it saves time and does not rely on a successful ROV operation.

One form of electrical continuity method employs an extended member (e.g. a cantilevered spring member) that has a projection. This projection is arranged to promote contact between the inner and outer members on insertion of one into the other. The projection can be any suitable projection, for example a point, a blade, a wheel, etc., and can be directly part of (e.g. integral with) the extended member or can be a separate element fixed to the extended member permanently or impermanently. The extended member holds the projection encroaching into the path of the penetrating member. Once the penetrating member contacts the projection it causes the extended member to displace laterally whilst generating resistance in the extended member. The displacement and associated resistance causes the projection to remain in contact with the surface of the inner or outer member. Due to the tolerance gap between the member the size of the projection must be set at a distance that will ensure positive contact with the inner member whilst the space behind the collar is sufficient to accommodate the displaced extended member and projection. The stiffness of the extended member will be chosen to ensure sufficient resistance is provided optionally to cause local penetration of the surface inner member and therefore ensuring a reliable electrical contact.

In addition the spring may have an adjustment bolt to pull the spring away from contacting the inner member surface. In this way the electrical contact may be tested separately. Also the position of the external bolt will indicate the successful movement of the internal spring.

An alternative means to achieve the same would be by using a wheel mounted on the extended member. This wheel can have a sharp edge. This allows a rotating (sharp) contact that will be resilient and again allow a small penetration of the wheel into the surface of the inner member. The spring may be set forward of the inside face of the collar to ensure adequate displacement and therefore force between the wheel edge and the outer surface of the inner member.

Thus, in some applications there may be an advantage in maintaining a reliable electrical connectivity between inner and outer members. Such connectivity would promote effective cathodic protection of the exposed surfaces when used in an underwater environment.

In FIG. 40 a threaded rod 175 is shown passing through the outer member (120) via a threaded boss (177) attached to the outer member or alternatively via a threaded hole in the outer member. By rotating grab handle or plate (176) so the forward end of the threaded rod (178) may be caused to contact the inner member (122) thereby creating an electrical path between the two.

Figure 43:
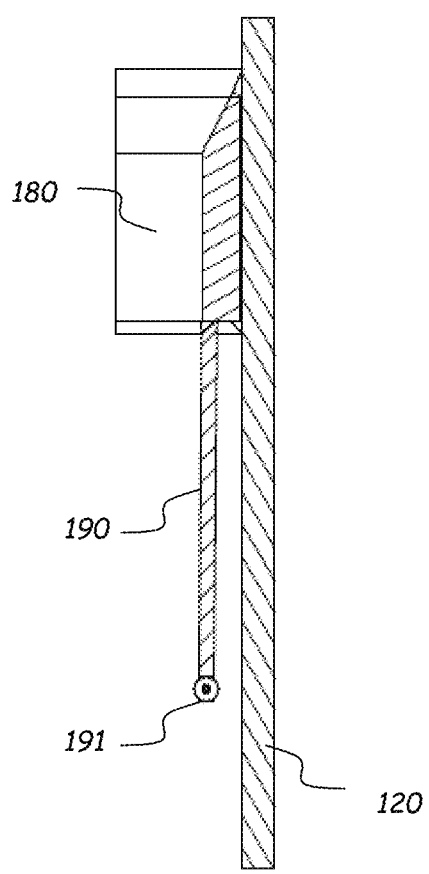
FIG. 43 shows various configurations whereby an electrical path can be created between the two members.
Figure 44:
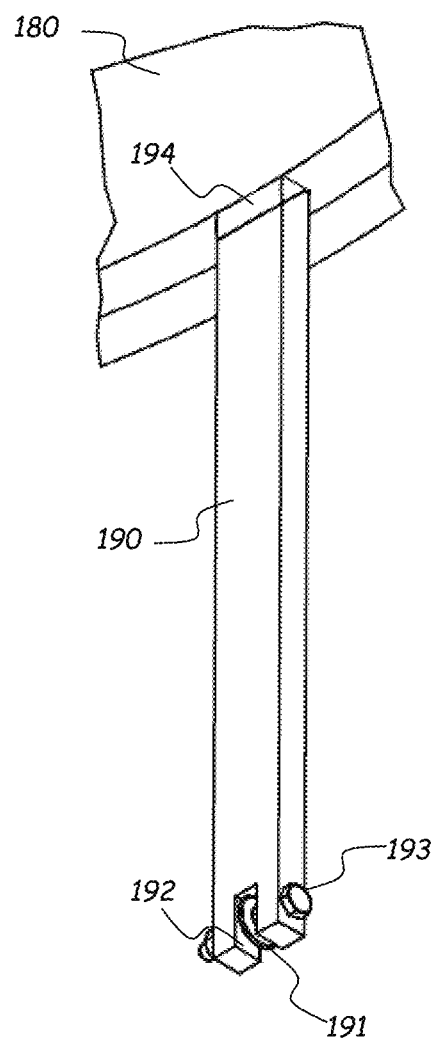
FIG. 44 shows various configurations whereby an electrical path can be created between the two members.

In FIG. 43 a flexible member (190) is shown extending from the shaped collar (180) (optionally attached via a weld (194)). The end of the flexible member has a notch (192) with a sharp edged circular wheel (191) mounted within, secured using a bolt (193). In this way the wheel is free to rotate. The wheel edge projects inward of the flexible member such that on introducing the penetrating inner member (122)—not shown—the outer surface of the inner member contacts the wheel and deform the flexible member (190) outboard. In doing so this will generate a positive contacting force between the inner member and the edge of the wheel. As a result as the inner member penetrates the outer member (120) the wheel will maintain positive contact.

In FIGS. 45 to 47 an alternative arrangement is shown whereby a similar flexible member (190) is shown extending from/attached to the shaped collar (180). The end of the flexible member has a sharp edged shaped plate (195) attached. The sharp edged shaped plate projects inward of the flexible member such that on introducing the penetrating inner member (122) the outer surface of the inner member contacts the plate (195) and deforms the flexible member (190) outboard. In doing so again will generate a positive contacting force between the inner member and the edge of the wheel. Similarly as the inner member penetrates the outer member (120) the plate will maintain positive contact.

With the components of the above features being electrically conductive so an electrical contact will be made regardless of the extent of penetration.

Either of the above flexible member arrangements may include an adjustable threaded rod (197) that attaches to the flexible member (190) and penetrates through a hole (196) in the outer member (120). A washer (198) and nut (199) may then be used to adjust the amount of inboard projection of the contacting features (191) or (195). Similarly the threaded rod may be adjusted sufficiently to prevent contact occurring if so desired.

Thus, electrical continuity may be automatically ensured between the outer and inner members. This may be via a resilient biased member that is displaced by the penetrating inner member so as to generate a positive contact pressure against the penetrating member. The resilient member may incorporate a sharp surface, knife edge, sharpened wheel or point that is intended to contact with the inner member.

Amongst other hostile environments the connector will be intended for use subsea. As the elements are primarily ferrous metals, albeit with protective coatings, there will be a need for cathodic protection of the surfaces to ensure the connector elements have an adequate design life. Typically the cathodic protection would be in the form of small flush anodes. In order to accommodate suitable anode materials apertures may be located within the strut shell/collar. This would allow anodes to be located in close proximity to the critical load bearing elements requiring protection. The anodes may sit within the aperture and be protected from contact with the penetrating member. The anodes may be attached directly to the periphery of the aperture or to the outer member whilst being accommodated within the aperture.

Thus, in some arrangements there is a collar or sleeve from which the struts are formed or attached, which incorporates openings to accommodate and protect cathodic protection anodes that might otherwise be damaged during penetration. The anodes can be attached to the collar itself or the inside face of the outer member.

Figure 48:
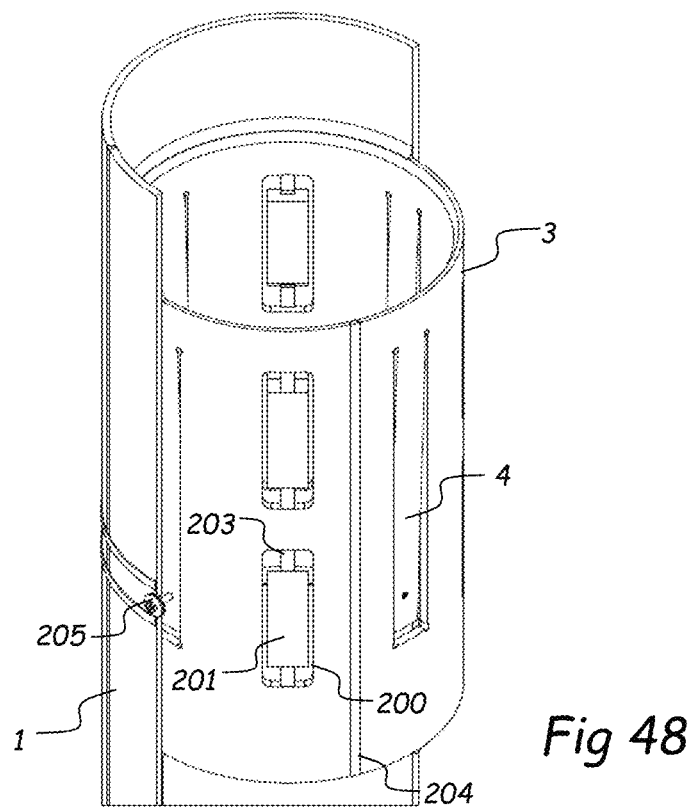
FIG. 48 shows a configuration which can accommodate cathodic protection anodes.
Figure 49:
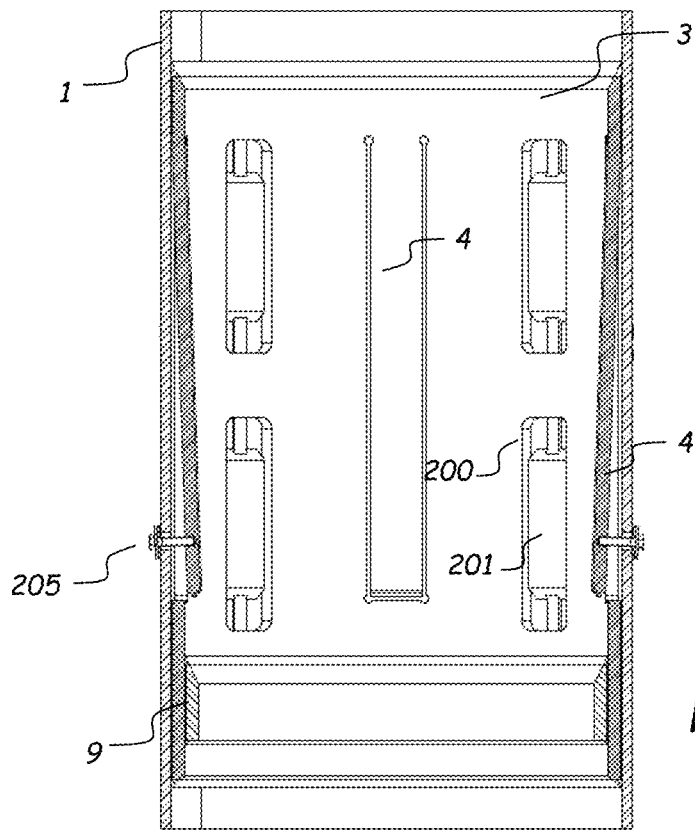
FIG. 49 shows a configuration which can accommodate cathodic protection anodes.

As shown in FIGS. 48 and 49 the collar (3) is attached to the outer member (1) with resilient struts (4) formed from the collar or sleeve (3). Within the collar (3) are openings (200) to accommodate cathodic protection anodes (201). The anodes may be attached to the collar or to the inside face of the outer member (1).

FIGS. 48 and 49 show an indicator assembly (205) whereby a threaded rod is attached to the resilient strut (4) and passes through a hole in outer member (1). The indicator assembly may by example consist of a threaded bolt with a washer and nut. In the initial condition whereby the inner member is not penetrating the outer then the washer would be flush with and contacting the external face of the outer member. During penetration of the inner member, not shown, the resilient strut would displace outboard thereby pushing the indicator assembly and moving the washer away from the reference face, namely the external face of the outer member. On engagement of the inner member with the outer the resilient strut distal end would return to its initial position and the washer would return to be in contact with the reference face. In this way it would be possible to ascertain the position of the resilient strut and in turn this would indicate the status of the connector (engaged or not engaged).

In some formats of the invention the compression resilient struts are exposed to risk of contact from foreign bodies. This could, for example, be in the form of fishing gear striking the structure. Were this to be the case some damage may be caused by the impact to the body of the resilient strut.

To avoid such damage a protection member may be attached to the outer member and span the gap created by the strut body. The profile of the protective member may be chosen to offer good deflection characteristics such as a smooth shell. Such a shape would avoid hooking of the impacting object. Likewise a longitudinal protection member of curved or rectilinear cross section may be used to offer simple energy absorbing qualities. The protective member may be attached to the outer member via welding. The ability to monitor and adjust the offset position of the strut can be maintained by providing a penetration or depression in the protection member thereby allowing passage of an indicator pin to permit an adjustment bolt assembly to remain attached to the strut and pass through the protection member.

Thus, in some arrangements any resilient struts that form part of the outer member can be protected using a local protection member attached to one or more sides of the opening used to form the strut. The protective member may be curved or rectilinear cross section such as an arc of a shell, a channel section, an angle section or simple flat plate.

In arrangements whereby the resilient struts form part of the outer member and are therefore exposed to potential damage. As these are critical load transferring elements there may be a requirement for protection of these resilient struts by an external plate or similar. This may take the form of a localised protective element in a curved plate or rectilinear shaped form.

Figures 50, 51:
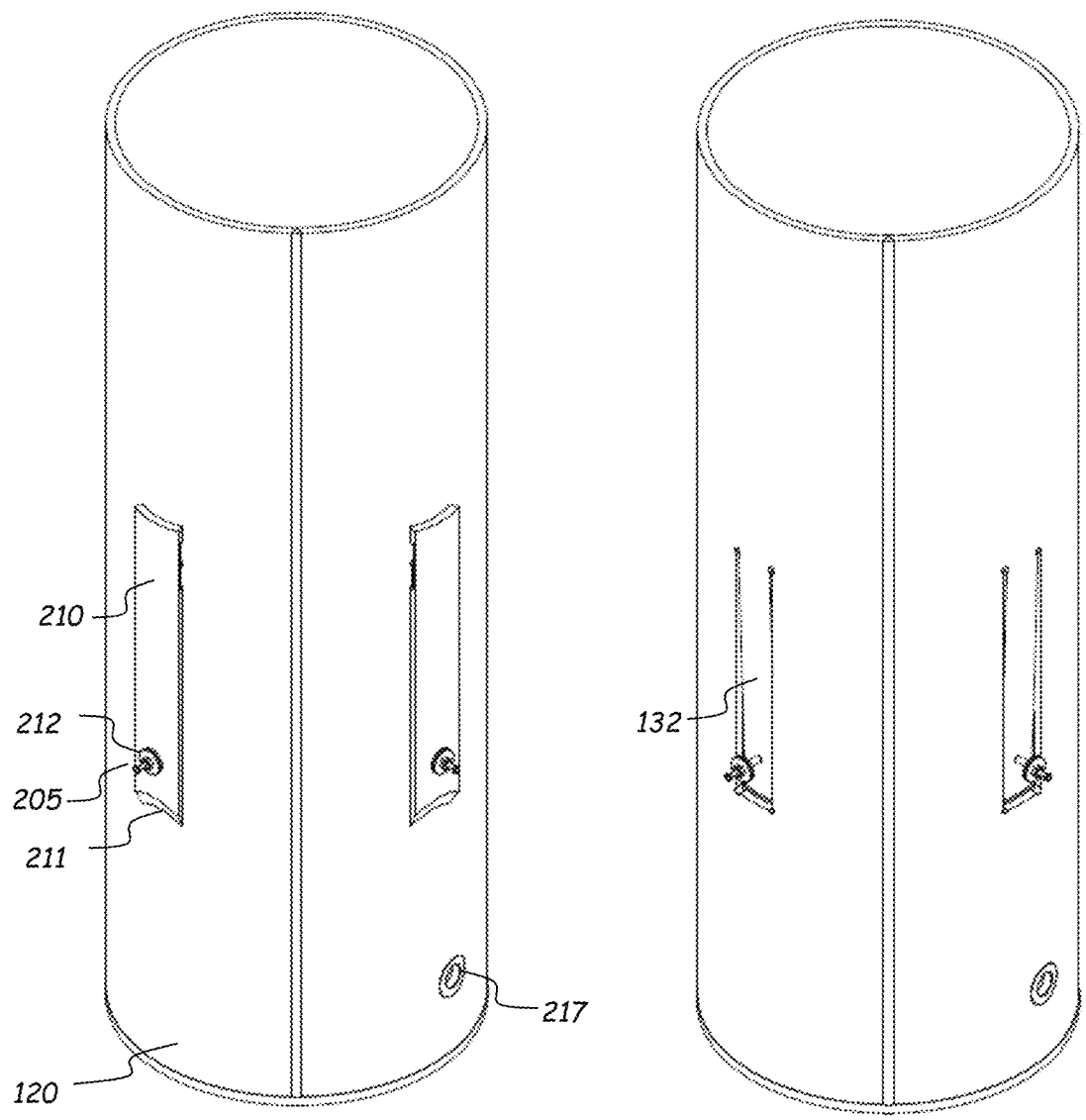
FIG. 50 shows various configurations having members to protect the struts.
FIG. 51 shows various configurations having members to protect the struts.

FIGS. 50 and 51 show such an arrangement whereby a curved shaped protective form (210) is introduced along the length of the strut (132). In FIG. 50 the protective form is shown whereas in FIG. 51 it is removed to better show the resilient strut (132).

Figure 52:
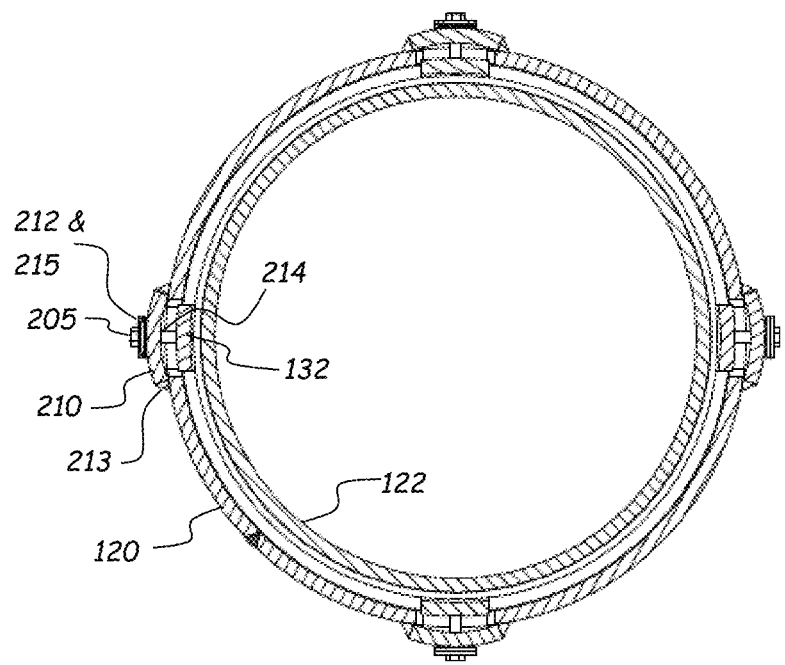
FIG. 52 shows various configurations having members to protect the struts.
Figure 53:
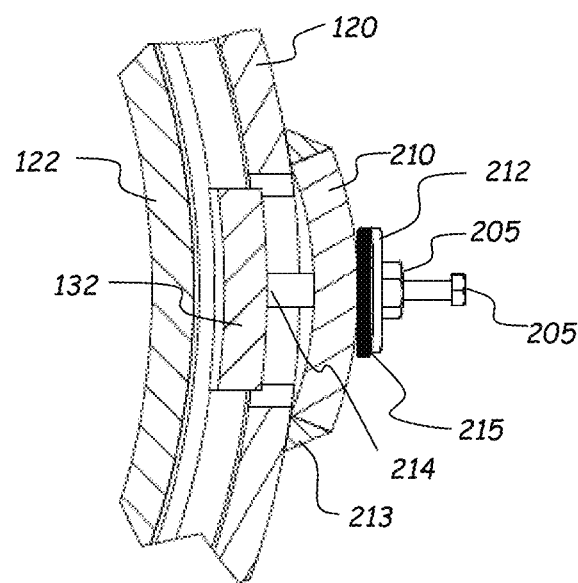
FIG. 53 shows various configurations having members to protect the struts.

FIG. 52 shows a cross section through both inner (122) and outer members (120) with the resilient strut (132) shown in the initial and therefore engaged position. FIG. 53 shows a detailed view of one such protective form (210) mounted onto the outer member (120). The protective form (210) is in this example, attached to the outer member (120) using welds (213) either side of the opening.

The protective shape can be attached to the outer member (120) on either side of the opening so as to afford protection to the strut whilst allowing the strut to freely move when required to do during penetration of an inner member.

The indicator assembly 205 with washer or plate (212) may be as described above to permit assessment of the connector status, i.e. engaged or not engaged by noting the distance between the washer and the outer surface of the protective form. In this case the reference face would be the face of the protective form rather than the face of the outer member. The washer may have an attached inner washer or plate of resilient material inner material, say silicone rubber or similar to cushion the repeated and potentially heavy contact between the surfaces during penetration of the inner member.

The protective form (210) may be shaped at either end (211) with a sloping face so as not to present an abrupt change of profile that may lead to potential hooking of any umbilical or cable.

Figures 54, 55, 56:
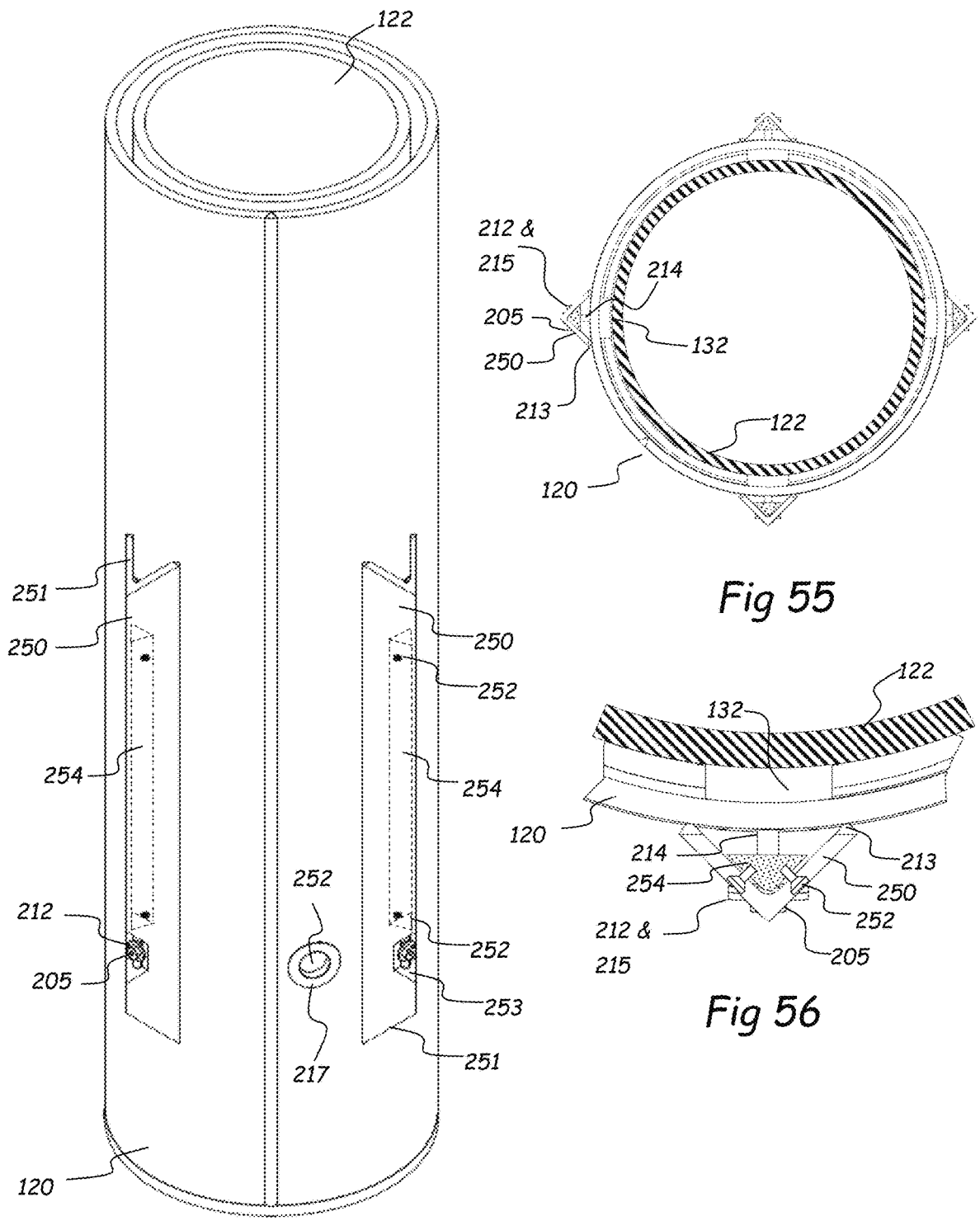
FIG. 54 shows various configurations having members to protect the struts.
FIG. 55 shows various configurations having members to protect the struts.
FIG. 56 shows various configurations having members to protect the struts.

FIGS. 54 to 56 show such an arrangement whereby the curved shaped protective form (210) is replaced by an angle cross section (250). FIG. 55 shows a cross sectional view and FIG. 56 a close up view through one resilient strut and associated protection member.

In this arrangement the indicator arrangement (212 & 213 mounted on threaded rod 214) is set within a depression (253) created in the protection member (250). This depression is created by removal of the apex of the member to form a flat surface onto which the washers may sit whilst affording protection for the indicator assembly from hooking.

Provision is also made for a linear section of cathodic anode material, suitable shaped, to fit the inside face of the protection member. The anode (254) may be attached to the protection member (250) via an arrangement of screws (252).

It can be seen that there is a gap between the inside face of the anode (254) and the outer face of the strut (132). This size of the gap will be determined so as to allow the protection member (250) to plastically deform under impact energy without contacting the strut.

In this arrangement the pile viewing hole (252) is level with the indicator assembly. This allows simultaneous viewing by a single camera of the pile mark (on the pile) and the indicator assembly without parallax issues that would otherwise occur should these features be set at a different axial position.

All earlier examples of resilient compression struts show the compression element attached to the body of the strut sleeve as a result of removal of material to form the element. Equally it may be that the struts are attached to the sleeve, for example using a welded joint. This can economise on the material used by removing the use of redundant material. Similarly for a single direction connection it may be that two sets of resilient struts may be formed from one cylinder or sleeve. This may be achieved by nesting the resilient struts in an arrangement whereby during their formation the struts are interlocking. This arrangement can then be split so that two sets of struts, each set attached to the cylinder or sleeve. Then these arrangements would form the load transferring elements for two such connectors, thereby saving material.

In such an arrangement the resilient struts and associated sleeve once attached to the outer member would have the resilient struts projecting forward in the direction of penetration of the inner member. Thus the lateral displaced movement of the resilient strut during penetration of the inner member would be unrestricted and simply move into the clear space formed during the formation of the resilient struts.

For example, the collar or sleeve from which emanates the compression strut can be of a form whereby the compression strut proximal end is attached to and extends from the edge of the collar or sleeve. In this way the compression strut when displaced laterally occupies a space in the same plane as the collar. In so doing a pair of collars plus their respective associated compression struts may be formed from a single cylinder or rectilinear cross section such that when separated and re-orientated there are two sets of collars and associated struts. This being an efficient use of materials and machining set up time whilst minimising material wastage and avoiding unnecessary use of redundant materials.

Figure 59:
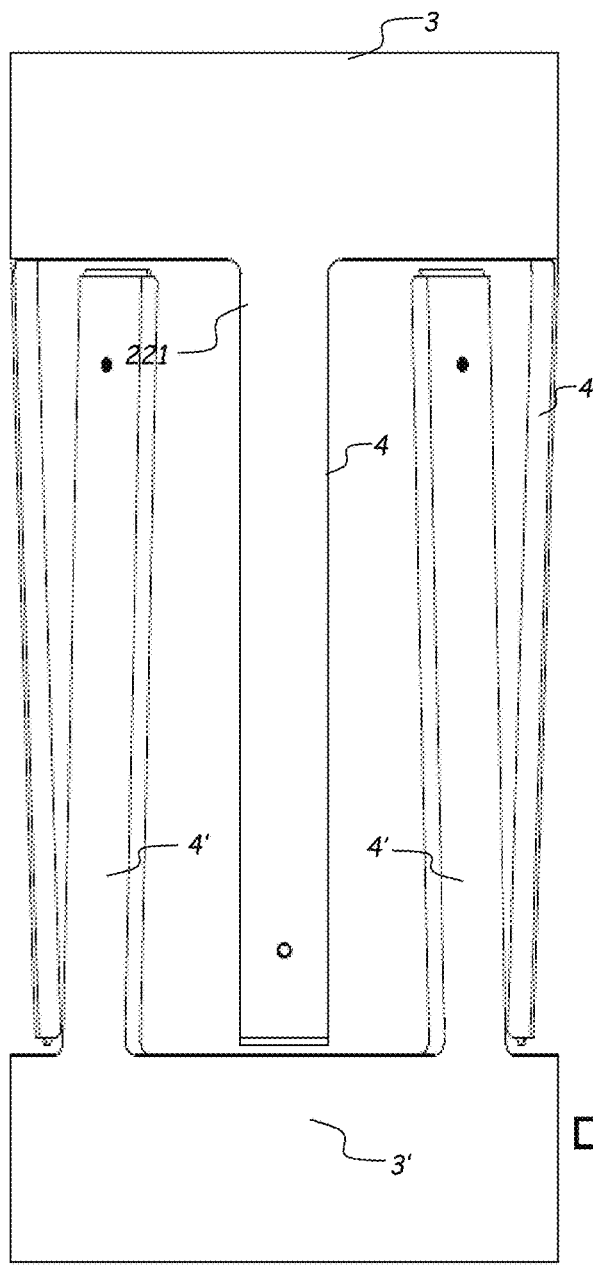
FIG. 59 shows a nested configuration of a collar.
Figure 60:
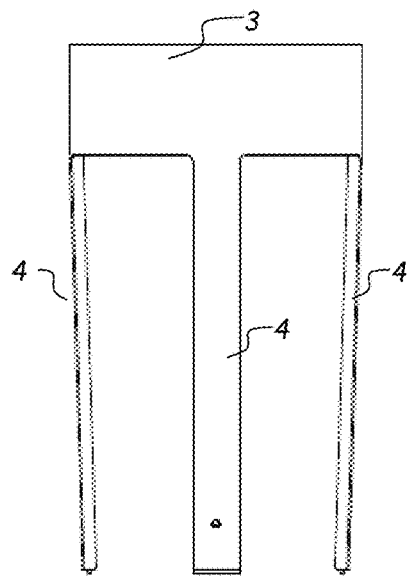
FIG. 60 shows a nested configuration of a collar.
Figure 61:
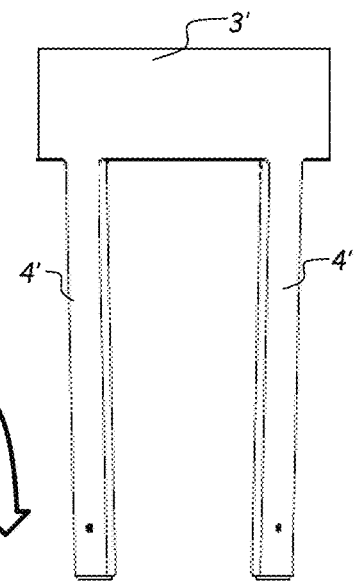
FIG. 61 shows a nested configuration of a collar.

To reduce weight and material wastage the collar (3) may be minimised by forming two such resilient strut arrangements from a single collar. FIG. 59 shows such an arrangement whereby the formation of the downward facing resilient struts (4) and associated collar (3) may be formed simultaneously with the upward facing struts (4') and associated collar (3'). In this way once separated and re-orientated the nested arrangements may form two similar arrangements. It may be that the remaining material pieces (220) that are redundant may be removed. For these arrangements the load transferring resilient struts may be similar to both the tenth and the second arrangements but created in a more efficient manner. As with second and the tenth arrangement, once these collars (3) and (3') are fixed and orientated within their respective outer members then during penetration of the inner member the initially displaced resilient strut (distal end) may be moved outboard into the space initially occupied when they were part of the single collar.

Figure 57:
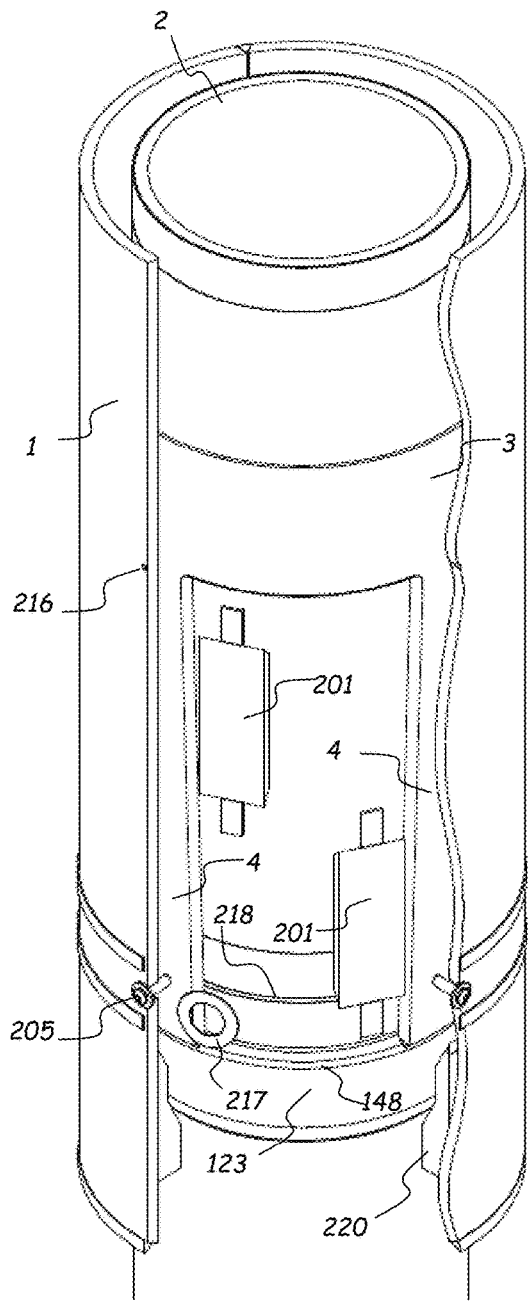
FIG. 57 shows another configuration of the joint arrangement discussed herein.
Figure 58:
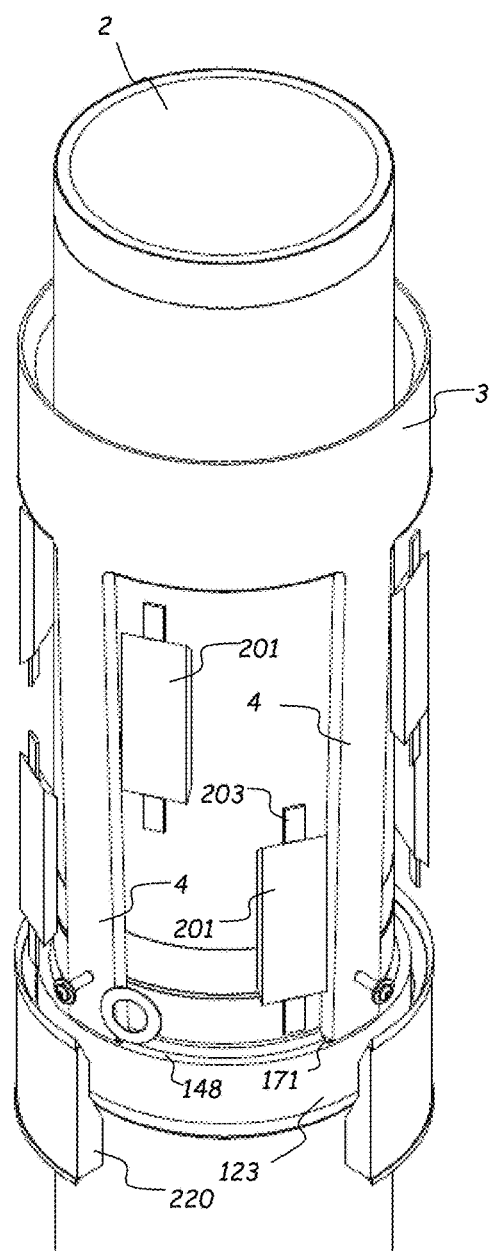
FIG. 58 shows another configuration of the joint arrangement discussed herein.

FIGS. 57 and 58 show another arrangement whereby a number of resilient struts (4) are protruding from a collar (3) that is in turn attached to the outer member via fillet welds top and bottom. On engagement of the inner member (2) to the outer member (1) the distal end of the struts (171) contact the bearing face (148) of the collar (123) attached to the inner member (2). The collar (123), attached to the inner member (2) is shaped to mate with a second collar (220) attached to outer member (1).

The second collar (220) may alternatively be a set of suitably shaped radial member. The second collar (220) provides a limit to the penetration of inner member (2) into the outer member (1) whilst the contact between the distal end of struts (171) and the bearing surface (148) of collar (123) prevents reversal of withdrawal of inner member once engaged.

The formation of the struts and strut collar are shown in FIG. 59. Here the downward facing struts (4) are attached to upper collar (3). Likewise the upward facing struts (4') are attached to lower collar (3'). In this way the shaped collars and struts may be formed from a single cylinder and then following drilling, removal of material and separation two such arrangements may be produced. By removing the lower arrangement and inverting it two identical forms may be made from one cylinder. This improves economy by reducing material wastage.

The collar (3) is in this instance attached to the outer member (1) by full circumferential welds along the top interface. A similar weld would also be intended at the bottom edge of the collar. This weld would not be continuous as it would be interrupted by lack of access to the interface in the region of the strut. As a result there is a potential for corrosion to occur between the inside surface of member (1) and the outside surface of collar (3). To eliminate such corrosion potential the section of the weld gap could be sealed using a suitable, optionally waterproof, filler material. Such sealant may be injected via a hole (216) introduced into the outer member (1) at suitable points.

In alternative or additional arrangements the compression strut distal end and the mating abutment face can have a complimentary shallow inclination angle with respect to the perpendicular to the strut axis such that on engagement of the inner and outer members the distal end returns towards its initial offset to a variable degree depending on the degree of axial misalignment of the members. The slope of the taper is generally less than the self-locking angle corresponding to the friction angle between the contact materials thereby ensuring the positive bearing contact will not disengage laterally when under axial load. The variable degree of lateral offset of the strut provides a means to accommodate the variable distance between the two sets of contacting surfaces.

It is recognised that the variation in distance that may be accommodated is small. As a result use may be made of mating collars either formed from or attached to both the inner and outer members having a complementary taper. In some arrangements this may be a shallow conical taper or equivalent tapered radials and a tapered cone. This taper ensures a positive and close fit between the two once engaged that both helps to transfer lateral load and moment between the two members whilst providing accurate control over the limit of member penetration and thereby assist the self-locking bearing face contact for axial load transfer as mentioned above.

Thus, the compression strut distal end and the mating abutment face can have a complimentary shallow angle with respect to the perpendicular to the strut axis such that on engagement of the inner and outer members the distal end returns towards its initial offset to a variable degree depending on the degree of axial misalignment of the members. The slope of the taper being less than the self-locking angle corresponding to the friction angle between the contact materials thereby ensuring the positive bearing contact will not disengage laterally when under axial load. The variable degree of lateral offset of the strut providing a means to accommodate the variable distance between the two sets of contacting surfaces and thereby distributing the load between the struts.

Figures 62, 63:
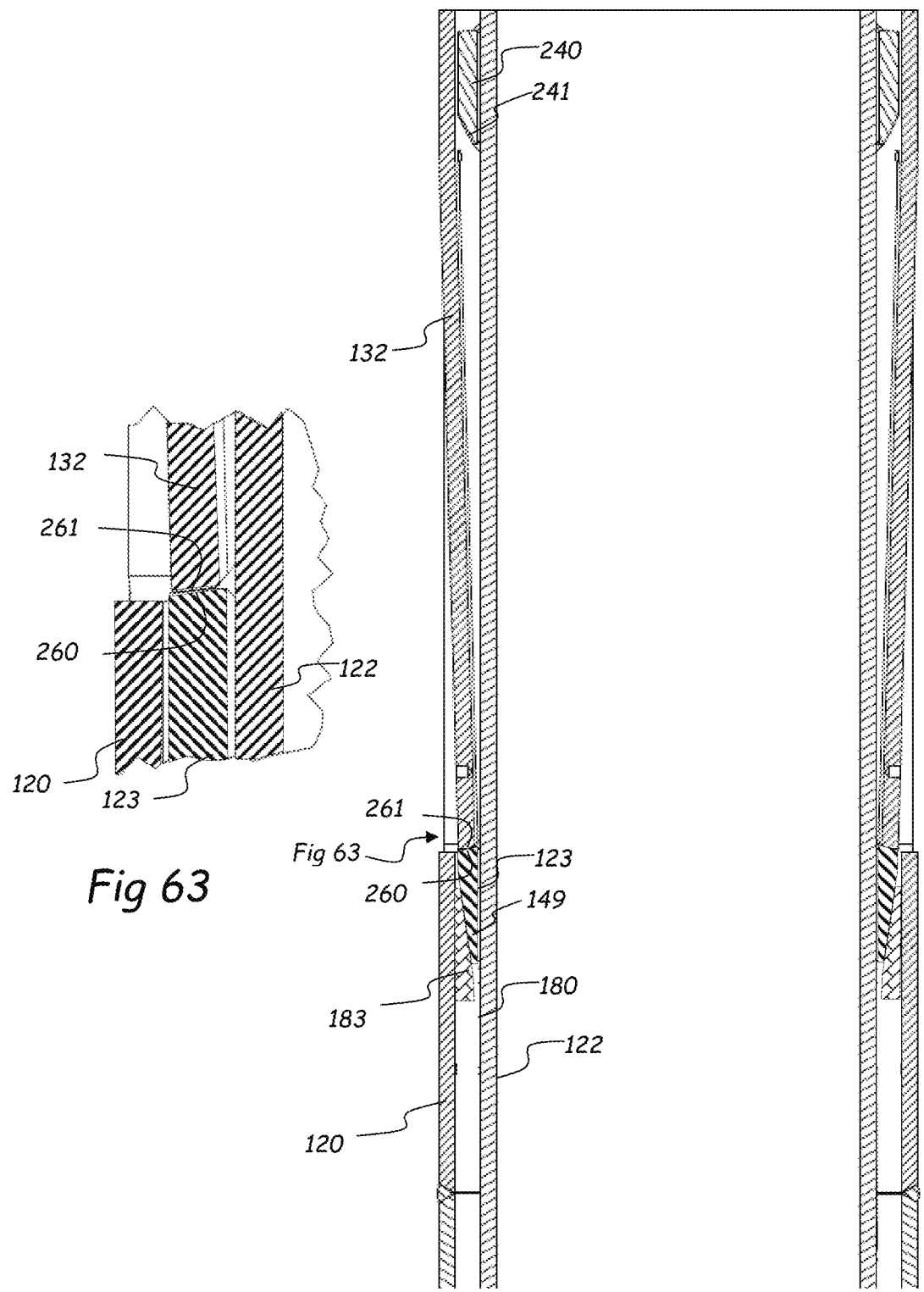
FIG. 62 shows another configuration of the joint arrangement discussed herein whereby tapers are present in the struts and/or collar abutment face.
FIG. 63 shows another configuration of the joint arrangement discussed herein whereby tapers are present in the struts and/or collar abutment face.

Examples of this are shown in FIGS. 62 and 63. FIG. 62 shows a longitudinal section through an engaged inner member (122) and associated attached collar (123) set within an outer member (120) and associated attached collar (183). FIG. 63 shows a close up section at the area of engagement showing compression strut (132) with distal end (261) bearing against an abutment surface (260) on collar (123).

In this arrangement the compression strut distal end (261) and the mating abutment face (260) have a complimentary shallow angle with respect to the perpendicular to the strut axis such that on engagement of the inner and outer members the distal end returns towards its initial offset to a variable degree depending on the degree of axial alignment of the members. The slope of the slope of the mating surfaces being less than the self locking angle corresponding to the friction angle between the contact materials thereby ensuring positive and reliable bearing contact that will not disengage laterally whilst under axial load. The variable degree of lateral offset of the strut providing a means to accommodate the variable distance between the two sets of contacting surfaces caused by misalignment.

To minimise the axial misalignment on engagement use can be made of complementary shallow conical tapers on the collars (123 and 183) mounted or incorporated on the inner and outer members such that the contacting surface (149) ensures a close fit between the two.

This close fitting conical taper ensures an ability to transfer lateral load and moment between the two members whilst providing accurate control over the limit of the inner member penetration. As a result the self locking bearing faces for axial load transference mentioned above will need only small variations in lateral movement of the strut to accommodate the variable distance between the strut distal end (261) and the mating bearing surface (260).

In addition to the above a spacer collar (240) may be attached to the inner member (122) to centralise the inner member with respect to the outer member (120). This improves axial alignment of the two members.

It is further recognised that the distal end could both incorporate a centralised bearing rail, shaped accordingly with a sloping contact surface) plus a complimentary shallow angle on the bearing surface (260) thereby combining a further means of accommodating axial misalignment of the members.

The previous arrangements utilise a strut with an initially laterally displaced strut tip at the distal end. An alternative would be to have an attached feature projecting from a strut whereby the strut tip itself is not initially displaced whereas the attached feature itself interferes with the free penetration of inner member. The passage of the inner member into the second member would cause the feature to be contacted and further penetration would cause a lateral displacement of the feature and the attached strut. The inner member would have either a collar or a groove that mates with the projecting feature of the strut such that following penetration any axial reverse movement of the inner member would be prevented.

The feature may be attached to the strut or machined from the strut body itself. The feature may be a plain bearing feature or have a shape or profile that fits closely to that of the inner member such that on axial reversal engagement would occur and in addition due to the matching profiles the rotation of the strut would be resisted. Such an interlocking rotational restraint would help in reducing any adverse effects of eccentric loadings in the strut and therefore permit higher axial loads to be transferred.

As with earlier examples the strut may be formed from the body of the outer member or from a sleeve attached to the outer member. Alternatively the strut may be formed from the inner member and the corresponding engaging collar or groove may form part of the outer member.

Figure 64:
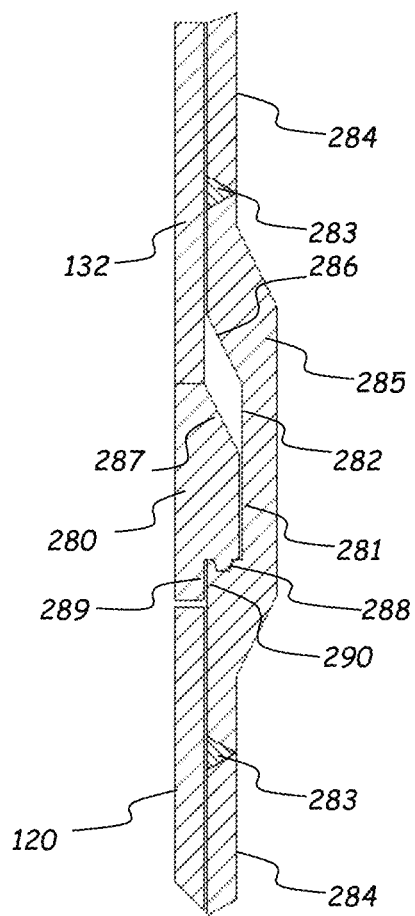
FIG. 64 show another configuration of the joint arrangement discussed herein whereby a hooking feature is present on the struts.
Figure 65:
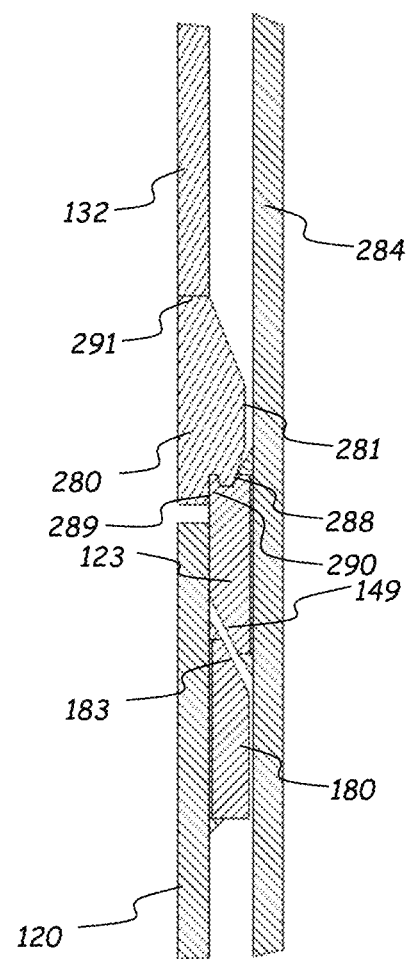
FIG. 65 show another configuration of the joint arrangement discussed herein whereby a hooking feature is present on the struts.
Figure 66:
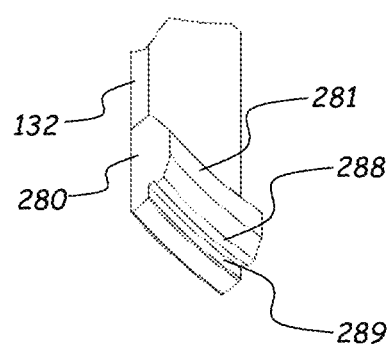
FIG. 66 show another configuration of the joint arrangement discussed herein whereby a hooking feature is present on the struts.

Such an arrangement is shown in FIGS. 64 and 65 which shows an alternative configuration for the distal end of the strut (132). Typically the strut distal end would be a plane section of plate formed from the outer member (120). It is understood that equally the end of the strut could be in the form of an attached hooking feature (280) that incorporates a shaped profile (288) that is engageable with a complimentary shaped feature attached to or formed from the inner member (284). The bearing feature on the inner member may be in the form of a collar as shown in FIG. 65 or a recess as shown in figure FIG. 64. The hooking feature (280) and associated interlocking profile is shown on the isometric view FIG. 66.

The hooking feature may include one or more bearing rails (288) as described herein that are deformable thereby accommodating a measure of misalignment whilst transferring axial load between the two members. Once engaged, the interlocking profile features offer means of both accommodating misalignment and also resistance to rotation of the distal end of the strut as the interfacing contact surfaces (289 and 290) and also, if needed (281) would resist such relative rotation. It is understood that such complementary profiles are examples and any of these contacting features may be modified to provide improved resistance.

Thus, in some arrangements at least one compression strut includes a hooking feature incorporated into the distal end of a compression strut that is engageable with a complimentary feature on the abutment face mounted on or forming part of the other member. Ideally the features interlock in a manner that resists rotation of the compression strut distal end when transferring load between the two. The mating profiles may include a deformable rail that accommodates relative inclination between the two members and better distributes the axial load.

Although a number of arrangements have been described separately from each other, it will be appreciated that this is for ease and brevity of description rather than an absolute requirement that the features of each arrangement are to be treated in isolation. Thus, one or more features of one or more of the arrangements which are compatible with one or more features of other arrangements can be incorporated into those other arrangements. The skilled person will readily understand how various features can be combined into further arrangements of the arrangements described herein.

The invention claimed is:

1. A joint arrangement for joining first and second longitudinally aligned members, said joint arrangement comprising:
   at least one cantilevered resilient strut arranged to project from said first longitudinally aligned member in an inboard manner towards a longitudinal axis of said first longitudinally aligned member or arranged to project from said second longitudinally aligned member in an outboard manner away from a longitudinal axis of said second longitudinally aligned member;
   said at least one cantilevered resilient strut comprising a proximal end attached to the member from which it projects and a distal end located away from the proximal end down a length of said member, wherein said at least one cantilevered resilient strut is resiliently biased such that when not under stress the distal end of said at least one cantilevered resilient strut is laterally displaced away from said member to which the at least one cantilevered resilient strut is attached;
   said distal end being arranged to abut a complementary mating abutment face on the other member when said second member penetrates and engages with said first member, wherein said complementary mating abutment face is a radially sloping profile provided on a circumferential collar or recess that extends radially around a major portion of the perimeters of the members, the sloping profile extending along a plane perpendicular to the axis of the longitudinally aligned members;
   wherein said at least one cantilevered resilient strut is a compression strut which acts to resist withdrawal of the second member via compression in the at least one cantilevered resilient strut and wherein the at least one cantilevered resilient strut is cut from the wall of the member from which it projects, or is cut from a sleeve that is attached to the first member or second member, creating a gap in the wall of the member or sleeve, respectively, which can accommodate the at least one cantilevered resilient strut when it is pushed towards the member on penetration of the second member into the first member; and
   wherein the distal end of the at least one cantilevered resilient strut and the complementary mating abutment face of the first or second member have a complimentary shallow angle with respect to the perpendicular to an axis of the at least one cantilevered resilient strut such that, in use, a radially sloped bearing surface of the abutment face has positive bearing contact with a complementary radially sloped surface of the distal end of the strut.

2. The joint arrangement of claim 1, wherein:
   (i) the at least one cantilevered resilient strut is arranged to project away in an inboard manner from the first member from which it is attached such that on penetration of the second member into the first member the second member moves past the proximal end of the at least one cantilevered resilient strut before reaching the distal end of the at least one cantilevered resilient strut; or
   (ii) said at least one cantilevered resilient strut further comprises grooves or slots set into the at least one cantilevered resilient strut.

3. The joint arrangement of claim 1, wherein the at least one cantilevered resilient strut comprises a plurality of struts arranged on at least one of the members.

4. The joint arrangement of claim 3, wherein the plurality of cantilevered resilient struts all project in the same orientation.

5. The joint arrangement of claim 3, wherein the plurality of cantilevered resilient struts comprise at least one cantilevered resilient strut projecting in an opposing orientation from at least one of the other cantilevered resilient struts wherein the opposing orientations comprise alternating directions of projections with the proximal and distal ends of each cantilevered resilient strut in alternating lengthwise configuration.

6. The joint arrangement of claim 1, wherein the at least one cantilevered resilient strut has a circular hole in at least one corner at a base of the cut which forms the proximal end of the cantilevered resilient strut.

7. The joint arrangement of claim 1, wherein the complementary mating abutment face on which the distal end of the at least one cantilevered resilient strut abuts is formed from the circumferential collar on which the radially sloping profile is provided, and the circumferential collar is attached to the other member.

8. The joint arrangement of claim 1, wherein the member to which the at least one cantilevered resilient strut is attached comprises a stop, said additional stop being configured to prevent said second member from further penetration into the first member by contact with a corresponding stop on the other member.

9. The joint arrangement of claim 1, wherein the mating abutment face of the first or second member comprises a plurality of mating abutment faces stops arranged at different longitudinal distances along the respective first or second member to allow for engagement of the at least one cantilevered resilient strut at different depths of penetration of the second member into the first member.

10. The joint arrangement of claim 1, wherein said second member has attached to it a third member, said third member being the member which penetrates the first member.

11. The joint arrangement of claim 1 further comprising a support structure permitting said at least one cantilevered resilient strut to be adjustably displaced to a desired offset position in both inboard and outboard directions, said support structure further providing positive lateral support to the at least one cantilevered resilient strut via contact from the first member.

12. The joint arrangement of claim 1, whereby at least one of the at least one cantilevered resilient struts has an indicator pin attached near its distal end the length of which may project to the outer face of the first member via a hole set in the first member so as to expose the indicator pin for visual reference.

13. The joint arrangement of claim 12, wherein the indicator pin is adjustable in its exposed length to allow a visual reference of the position of the at least one strut with respect to the first member; and
   (i) wherein the indicator pin has a threaded hole along at least a major part of its length to contain a locking screw at one end to fix the indicator pin at a projecting length and also allow a threaded bolt or attachment to be attached from the exterior of the first member; wherein said threaded bolt or attachment is used to move the at least one strut to a desired offset or allow disengagement; or
   (ii) wherein the indicator pin further comprises at least one cross hole to receive a transverse pin to be set thereby allowing the at least one cantilevered resilient strut to be temporarily held in a disengaged position; or
   (iii) further comprising a release arrangement whereby either (a) an extension feature to the indicator pin is shaped to assist a direct pull on the at least one cantilevered resilient strut via a threaded bar that by rotation creates a compression in the threaded bar and moves a shaped plate that bears against the extension feature delivering a pull to the at least one cantilevered resilient strut and displacing it laterally, optionally wherein the shaped plate is tapered in one plane and to be vee shaped in the other to assist alignment and positioning of the plate between the extension feature and the external face of the outer member; or (b) an extension feature to the indicator pin is shaped to assist a direct movement on the at least one cantilevered resilient strut via a threaded bar that is attached to a cam plate arrangement comprising a cam plate so that by rotation of the cam plate and contact with the external face of the outer member the threaded bar is tensioned delivering a force to the at least one cantilevered resilient strut and displacing it laterally.

14. The joint arrangement of claim 1, further comprising a locking arrangement whereby the at least one cantilevered resilient strut is prevented from being displaced to permit disengagement of the distal end of the at least one cantilevered resilient strut from its respective abutment face, optionally wherein the locking arrangement is in the form of a ring or sleeve that may be positioned to restrict lateral movement of the at least one cantilevered resilient strut.

15. The joint arrangement of claim 1, wherein at least one bearing rail is disposed on the at least one cantilevered resilient strut.

16. The joint arrangement of claim 1, wherein there is electrical continuity between the first and second members, wherein electrical continuity is provided by a resilient biased member extending from the first or second member that is displaced during insertion of one member into the other so as to generate a positive contact pressure against one or both first or second member.

17. The joint arrangement of claim 1, wherein the sleeve incorporates openings to accommodate and protect cathodic protection anodes.

18. The joint arrangement of claim 1, wherein two collars or sleeves plus associated cantilevered resilient struts are formed from a single cylinder in a nested arrangement such that when separated and re-orientated produces two similar sets of collars and associated struts.

19. The joint arrangement of claim 1, wherein the at least one cantilevered resilient strut forms part of the first longitudinally aligned member and is protected using a local protection member attached to at least one side of an opening used to form the at least one cantilevered resilient strut.

20. The joint arrangement of claim 1, wherein mating collars on the first and second members have a complementary shallow conical taper.

21. The joint arrangement of claim 1, wherein the at least one cantilevered resilient strut is arranged to project away in an outboard manner from the second member such that on penetration of the second member into the first member the first member moves past the proximal end of the at least one cantilevered resilient strut before reaching the distal end of the at least one cantilevered resilient strut.

* * * * *